US012810351B2

(12) United States Patent
Patton et al.

(10) Patent No.: US 12,810,351 B2
(45) **Date of Patent: *Nov. 24, 2026**

(54) REGENERATIVE MODEL-CONTINUOUS EVOLUTION SYSTEM

(71) Applicant: TRETE Inc., Prosper, TX (US)

(72) Inventors: Damien Patton, Plano, TX (US); Christian Gratton, Eaton Rapids, MI (US)

(73) Assignee: TRETE Inc., Prosper, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/366,395

(22) Filed: Oct. 22, 2025

(65) Prior Publication Data

US 2026/0050977 A1 Feb. 19, 2026

Related U.S. Application Data

(63) Continuation of application No. 19/193,326, filed on Apr. 29, 2025, now Pat. No. 12,406,305, which is a (Continued)

(51) Int. Cl.
*G06Q 40/02* (2023.01)
*G06Q 20/40* (2012.01)
(Continued)

(52) U.S. Cl.
CPC ....... *G06Q 40/024* (2025.08); *G06Q 20/4016* (2013.01); *G06Q 30/0185* (2013.01);
(Continued)

(58) Field of Classification Search
CPC ............... G06Q 40/04; G06Q 20/4016; G06Q 30/0185; G06Q 30/0215; G06Q 40/06;
(Continued)

(56) References Cited

U.S. PATENT DOCUMENTS 8,688,494 B2 4/2014 Coon
11,314,620 B1 * 4/2022 Lin ........................ G06N 3/105
(Continued)

FOREIGN PATENT DOCUMENTS

CA 3062805 A1 5/2020
CA 3173084 A1 9/2021
(Continued)

OTHER PUBLICATIONS

Elmougy et Liu, "Demystifying Fraudulent Transactions and Illicit Nodes in the Bitcoin Network for Financial Forensics" May 25, 2023, arXiv: 2306.06108v1, pp. 1-16. (Year: 2023).*

(Continued)

*Primary Examiner* — Chase P. Hinckley

(57) ABSTRACT

In certain aspects of the disclosure, a computer-implemented method includes receiving a selection of a model from a plurality of models running on an ecosystem. The method includes receiving annotated datasets with correct examples and incorrect examples. The method includes training, responsive to receiving the annotated datasets, the model based on the annotated datasets. The method includes running the model based on the training. The method includes receiving a feedback score of results from running the model based on the annotated datasets. The method includes iteratively running, until the feedback score is above a predetermined threshold, the model responsive to user evaluation of the results from running the model based on the annotated datasets. The method includes publishing the model responsive to the feedback score being above the predetermined threshold.

14 Claims, 11 Drawing Sheets

Related U.S. Application Data continuation of application No. 18/620,299, filed on Mar. 28, 2024, now Pat. No. 12,307,525, which is a continuation-in-part of application No. 18/616,143, filed on Mar. 25, 2024, now Pat. No. 12,154,175.

(60) Provisional application No. 63/615,128, filed on Dec. 27, 2023, provisional application No. 63/615,145, filed on Dec. 27, 2023, provisional application No. 63/615,108, filed on Dec. 27, 2023, provisional application No. 63/615,136, filed on Dec. 27, 2023, provisional application No. 63/600,381, filed on Nov. 17, 2023, provisional application No. 63/596,471, filed on Nov. 6, 2023, provisional application No. 63/515,337, filed on Jul. 24, 2023, provisional application No. 63/509,266, filed on Jun. 20, 2023, provisional application No. 63/509,261, filed on Jun. 20, 2023, provisional application No. 63/509,257, filed on Jun. 20, 2023, provisional application No. 63/509,264, filed on Jun. 20, 2023, provisional application No. 63/454,622, filed on Mar. 24, 2023.

(51) Int. Cl.

| | |
|---|---|
| ***G06Q 30/018*** | (2023.01) |
| ***G06Q 30/0207*** | (2023.01) |
| ***G06Q 40/03*** | (2023.01) |
| ***G06Q 40/04*** | (2012.01) |
| ***G06Q 40/06*** | (2012.01) |
| ***G06Q 40/08*** | (2012.01) |
| *G06N 20/00* | (2019.01) |

(52) U.S. Cl.
CPC ..... *G06Q 30/0215* (2013.01); *G06Q 40/0325* (2025.08); *G06Q 40/04* (2013.01); *G06Q 40/06* (2013.01); *G06Q 40/083* (2025.08); *G05B 2219/31396* (2013.01); *G06N 20/00* (2019.01)

(58) Field of Classification Search
CPC ............. G06Q 40/024; G06Q 40/0325; G06Q 40/083; G05B 2219/31396; G06N 20/00
See application file for complete search history.

(56) References Cited

U.S. PATENT DOCUMENTS

| | | | | |
|---|---|---|---|---|
| 11,989,776 | B1 | 5/2024 | Hepp | |
| 12,217,271 | B1 * | 2/2025 | Sardanopoli | G06Q 30/018 |
| 2014/0279386 | A1 | 9/2014 | Meyer | |
| 2016/0281607 | A1 | 9/2016 | Asati | |
| 2017/0161758 | A1 | 6/2017 | Towriss | |
| 2019/0171428 | A1 | 6/2019 | Patton | |
| 2019/0304104 | A1 | 10/2019 | Amer | |
| 2021/0034960 | A1 | 2/2021 | Khapall | |
| 2022/0067738 | A1 * | 3/2022 | Fang | G06Q 20/389 |
| 2022/0207349 | A1 | 6/2022 | Fusco | |
| 2022/0222657 | A1 | 7/2022 | Nichani | |
| 2022/0335296 | A1 * | 10/2022 | Baker | G06N 3/082 |
| 2022/0398337 | A1 | 12/2022 | Franquin | |
| 2023/0031123 | A1 * | 2/2023 | Giokas | G06N 20/20 |
| 2023/0049167 | A1 | 2/2023 | Wilson | |
| 2023/0095728 | A1 * | 3/2023 | Cao | G06N 3/08 705/44 |
| 2023/0097897 | A1 | 3/2023 | Campos | |
| 2023/0131393 | A1 * | 4/2023 | Tomasic | G09B 5/06 704/275 |
| 2023/0148321 | A1 * | 5/2023 | Hall | G16H 50/20 706/12 |
| 2023/0162088 | A1 | 5/2023 | Woodward | |
| 2023/0177512 | A1 * | 6/2023 | Laptiev | G06Q 40/03251 705/44 |
| 2023/0297831 | A1 * | 9/2023 | Saadi | G06N 3/0464 706/25 |
| 2023/0316282 | A1 * | 10/2023 | Umesh | G06Q 90/00 |
| 2024/0177164 | A1 * | 5/2024 | Pandey | G06Q 20/407 |
| 2024/0202339 | A1 * | 6/2024 | Fitzgerald | G06F 21/53 |
| 2024/0211966 | A1 * | 6/2024 | Hosseinali | G06Q 30/0185 |
| 2024/0220824 | A1 | 7/2024 | Gilad | |
| 2024/0235921 | A9 | 7/2024 | Naga | |
| 2024/0249290 | A1 | 7/2024 | Mikhael | |
| 2024/0257157 | A1 * | 8/2024 | Katt | G06Q 30/0185 |
| 2024/0257255 | A1 | 8/2024 | Gupta | |
| 2024/0340314 | A1 | 10/2024 | Radon | |
| 2024/0354436 | A1 | 10/2024 | Mukherjee | |
| 2024/0362716 | A1 | 10/2024 | Woiwood | |
| 2024/0412220 | A1 * | 12/2024 | Robell | G06F 21/31 |
| 2024/0420147 | A1 * | 12/2024 | Taneja | G06Q 20/4016 |
| 2025/0029107 | A1 * | 1/2025 | Metz | G06N 3/08 |
| 2025/0104073 | A1 * | 3/2025 | Chou | G06N 20/00 |
| 2025/0111256 | A1 * | 4/2025 | Rosenoer | G06N 7/01 |
| 2025/0133081 | A1 * | 4/2025 | Kumar | H04L 63/08 |
| 2025/0165978 | A1 * | 5/2025 | Howard | G06N 20/00 |

FOREIGN PATENT DOCUMENTS

| | | | | |
|---|---|---|---|---|
| WO | 2019141984 | A1 | 7/2019 | |
| WO | WO-2023183494 | A1 * | 9/2023 | H04L 9/3236 |

OTHER PUBLICATIONS

Palaiokrassas et al., "Leveraging Machine Learning for Multichain DeFi Fraud Detection" May 17, 2023, arXiv: 2306.07972v1, pp. 1-11. (Year: 2023).*

Chalkidis et al., "Regulatory Compliance through Doc2Doc Information Retrieval: A case study in EU/UK legislation where text similarity has limitations" Jan. 26, 2021, arXiv: 2101.10726v1, pp. 1-14. (Year: 2021).*

Hu et al., "BERT4ETH: A Pre-trained Transformer for Ethereum Fraud Detection" Oct. 30, 2023, arXiv: 2303.18138v2, pp. 1-10. (Year: 2023).*

Amoussou, Mandela, "What is a Cap Table, and Why are they Important?", from Digital Securities, Published Jan. 10, 2023.

Politou, E. et al., "Blockchain Mutability: Challenges and Proposed Solutions", from IEEE Transcations on Emerging Topics in Computing, Published Oct. 25, 2019.

Non-Final Office Action, U.S. Appl. No. 18/616,143, Mailing Date Aug. 8, 2024, 15 pages.

Notice of Allowance, U.S. Appl. No. 18/616,143, Maling Date Oct. 17, 2024, 8 pages.

Non-Final Office Action, U.S. Appl. No. 18/616,149, Mailing Date Jul. 17, 2024, 14 pages.

Final Office Action, U.S. Appl. No. 18/616,149, Mailing Date Oct. 15, 2024, 6 pages.

Notice of Allowance, U.S. Appl. No. 18/616,149, Mailing Date Nov. 12, 2024, 8 pages.

Non-Final Office Action, Appl. No. 18/620,299, Mailing Date Jul. 30, 2024, 13 pages.

Final Office Action, U.S. Appl. No. 18/620,299, Mailing Date Nov. 27, 2024, 21 pages.

Li et al,. "TradingGPT: Multi-Agent System with Layered Memory and Distinct Characters for Enhanced Financial Trading Performance", Sep. 7, 2023, arXiv:2309.03736v1, pp. 1-7. (Year: 2023).

Romanko et al., "ChatGPT-based Investment Portfolio Seleciton", Aug. 11, 2023, arXiv:2308.06260, pp. 1-25. (Year: 2023).

Wu, Bingzhe "Is GPT4 a Good Trader?" Sep. 20, 2023, arXiv2309.10982v1, pp. 1-6. (Year: 2023).

Kang at al., "Deficiency of Large Language Models in Finance: An Emperical Examination of Hallucination", Nov. 27, 2023, arXiv:2311.15548v1, pp. 1-15. (Year: 2023).

Crall, Jon, "The MCC Approaches the Geometric Mean of Precision and Recall as True Negatives Approach Infinity", Jul. 9, 2023, arXiv: 2305.00594v2, pp. 1-4. (Year: 2023).

Kynkaaniemi et al., "Improved Precision and Recall for Assessing Generative Models", Oct. 30, 2019, arXiv:1904.06991v3, pp. 1-16. (Year:2019).

(56) References Cited

OTHER PUBLICATIONS

Sajjadi et al., "Assessing Generative Models via Precision and Recall", Oct. 28, 2018, arXiv: 1806.00035v3. pp. 1-15. (Year: 2018).
Yang et al., "FinGPT: Open-Source Financial Large Language Models", Jun. 9, 2023, arXiv: 2306.06031v1, pp. 1-7. (Year: 2023).
Zhang et al., "Enhancing Financial Sentiment Analysis via Retrieval Augmented Large Language Models", Nov. 4, 2023, arXiv: 2310.04027v2, pp. 1-8. (Year: 2023).
Non-Final Office Action, U.S. Appl. No. 18/963,508, Mailing Date Feb. 5, 2025, 13 pages.
Notice of Allowance, U.S. Appl. No. 18/963,508, Mailing Date Apr. 2, 2025, 8 pages.
Non-Final Office Action, U.S. Appl. No. 18/963,512, Mailing Date Jan. 28, 2025, 16 pages.
Notice of Allowance, U.S. Appl. No. 18/963,512, Mailing Date Mar. 24, 2025, 8 pages.
Notice of Allowance, U.S. Appl. No. 18/620,299, Mailing Date Apr. 9, 2025, 8 pages.
Notice of Allowance, U.S. Appl. No. 18/616,143, Mailing Date Oct. 17, 2024, 8 pages.
Non-Final Office Action, U.S. Appl. No. 18/924,100, Mailing Date Jan. 10, 2025, 6 pages.
Non-Final Office Action, U.S. Appl. No. 18/924,100, Mailing Date Feb. 11, 2025, 18 pages.
Non-Final Office Action, U.S. Appl. No. 18/924,100, Mailing Date Apr. 14, 2025, 25 pages.
Non-Final Office Action, U.S. Appl. No. 18/924,122, Mailing Date Jan. 24, 2025, 6 pages.
Non-Final Office Action, U.S. Appl. No. 18/924,122, Mailing Date Apr. 11, 2025, 11 pages.
Non-Final Office Action, U.S. Appl. No. 19/052,873, Mailing Date Apr. 15, 2025, 16 pages.
Notice of Allowance, U.S. Appl. No. 19/193,326, Mailing Date Jul. 2, 2025, 9 pages.
Final Office Action, U.S. Appl. No. 19/052,873, Mailing Date Apr. 15, 2025, 20 pages.

* cited by examiner

REGENERATIVE MODEL-CONTINUOUS EVOLUTION SYSTEM

CROSS REFERENCE TO RELATED APPLICATIONS

The present application is a continuation of U.S. patent application Ser. No. 19/286,270, entitled "Regenerative Model-Continuous Evolution System", filed Jul. 31, 2025, which is incorporated herein in its entirety.

U.S. patent application Ser. No. 19/286,270 is a continuation of U.S. patent application Ser. No. 19/193,326, now U.S. Pat. No. 12,406,305, entitled "Regenerative Model-Continuous Evolution System", filed Apr. 29, 2025, which is incorporated herein in its entirety.

U.S. patent application Ser. No. 19/193,326, is a continuation of U.S. patent application Ser. No. 18/620,299, now U.S. Pat. No. 12,307,525 entitled "Regenerative Model-Continuous Evolution System", filed Mar. 28, 2024, which is incorporated herein in its entirety.

U.S. patent application Ser. No. 18/620,299 is a continuation-in-part of U.S. patent application Ser. No. 18/616,143, now U.S. Pat. No. 12,154,174, entitled "Transaction Platform With Synchronized Semi-Redundant Ledgers," filed on Mar. 25, 2024, U.S. patent application Ser. No. 18/616,143 claims the benefit of priority under 35 U.S.C. § 119 from U.S. Provisional Patent Application Ser. No. 63/454,622, entitled "Transaction Platform With Synchronized Semi-Redundant Ledgers," filed on Mar. 24, 2023, all of which are incorporated herein by reference in its entirety for all purposes.

U.S. patent application Ser. No. 18/620,299 claims the benefit of priority under 35 U.S.C. § 119 from U.S. Provisional Patent Application Ser. No. 63/509,257, entitled "Data Retrieval and Validation for Asset Onboarding," filed on Jun. 20, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/509,261, entitled "Data Validation and Assessment Valuation," filed on Jun. 20, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/509,264, entitled "Secure Identifier Integration," filed on Jun. 20, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/509,266, entitled "Dual Ledger Syncing," filed on Jun. 20, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/515,337, entitled "Metadata Process, with Static and Evolving Attributes, Introduced into Tokenization Standards," filed on Jul. 24, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/596,471, entitled "Real Asset Fractionalization Algorithm," filed on Nov. 6, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/600,381, entitled "Settlement and Approval Service," filed on Nov. 17, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/615,108, entitled "Live Syncing Capitalization Table System," filed on Dec. 27, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/615,128, entitled "Transaction Flow with Master Account Ledger and Escrow Ledger Interaction," filed on Dec. 27, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/615,136, entitled "Regenerative Model-Continuous Evolution System ("RM-CES")," filed on Dec. 27, 2023, all of which is incorporated herein by reference in its entirety for all purposes. U.S. patent application Ser. No. 18/620,299 claims the benefit of priority under 35 U.S.C. § 119 from U.S. Provisional Patent Application Ser. No. 63/615,145, entitled "Transaction & Settlement Validation Service ("TSVS")," filed on Dec. 27, 2023, all of which is incorporated herein by reference in its entirety for all purposes.

TECHNICAL FIELD

The present disclosure generally relates to blockchain technology, e.g., cryptographically encoded ledgers distributed across a computing network, and more specifically relates to transaction platforms with semi-redundant ledgers.

BACKGROUND

There is a need for a technology platform that can create digital securities out of what are known as "real assets" and can function as a secondary market platform or Financial Exchange for these types of assets as well as for other types of assets such as, but not limited to, investments in franchises, investments in business that generate dividends or returns based on performance of the business or underlying asset, investments in ventures that capture or mine natural resource such as, but not limited to uranium, timber, and other commodities, private credit, private debt, intangible assets, tradeable assets, and any other types of appropriate assets. Examples of real assets include office buildings, multi-family apartment buildings, car washes, private planes or yachts, antique cars, art, jewelry, insurance policies, and even structured products that are based on the performance of an underlying asset (e.g., a racehorse). It should be understood that the disclosed technology is not limited to creating digital securities.

Real estate, for example, has long been a preferred investment, offering competitive risk-adjusted returns and a hedge against inflation. Direct investments in industries, such as real estate, e.g., purchasing real estate directly, involves deploying and risking large initial and ongoing financial sums. In contrast, indirect investments, e.g., Real Estate Investment Trusts (REITs) and other deal structures and/or securities that pool sums of money from multiple investors together to purchase investments, facilitate individual investors deploying and risking smaller initial and ongoing financial sums. Such indirect investments also involve other costs and require compliance with relevant securities statutes and regulations.

The description provided in the background section should not be assumed to be prior art merely because it is mentioned in or associated with the background section. The background section may include information that describes one or more aspects of the subject technology.

SUMMARY

An exemplary aspect relates to an electronic and computer technology platform for facilitating a "closed" electronic secondary market exchange for tokens (e.g., cryptographic tokens that represent shares or other interests in real estate and/or other assets) which are created by and may be traded by participants registered and validated by a computer system integrated within the technology platform (as opposed to third party token marketplaces). The technology platform includes a novel specialized computer architecture and customized computer code adapted and programmed to implement novel functions that are not currently and have not previously been performed with prior asset exchange platforms. Novel aspects include semi-redundant ledgers that are automatically synchronized by the computer system and which overcome other technical limitations of prior transaction management systems. (possible to have third party market places)

An exemplary aspect relates to a pair of synchronized semi-redundant ledgers that maintain a public and/or private record of each transaction executed on the platform (for example, recorded on a blockchain), in which personally identifiable information (PII) of parties to the transaction are not disclosed and therefore not publicly accessible via the semi-redundant ledgers. In other aspects, the pair of synchronized semi-redundant ledgers maintain, instead, a private record of each transaction. An example can be a regular ledger of any type that is backed up and synchronized with a blockchain (public or private ledger). This automated auditing mechanism facilitates fraud, theft, and loss (if used for inventory instead of real assets). For example, a Consumer Packaged Goods ("CPG") company could keep their entire inventory system on the blockchain to audit stores to control shrinkage, loss prevention, and/or theft.

An exemplary aspect of the disclosed technology includes a computer system specially configured and programmed to perform functions of a transaction platform that includes a network-accessible computer server system with semi-redundant ledgers which are automatically synchronized by the computer system. The semi-redundant ledgers include a first ledger type that may include a database (e.g., centrally controlled by an operator of the computer system); a tokenization module configured to create and/or manage tokens as described herein and configured to interact with a second ledger (e.g., a blockchain); a digital wallet management module configured to receive, store, and transmit digital tokens; and a role-based access module configured to validate participants and their authorized roles as well as authorize and/or limit the participants' functional interactions with the computer system based on their approved roles. The transaction platform with semi-redundant ledgers may provide mechanisms by which investors may trade and/or exchange (e.g., acquire and/or transfer) tokenized portions of real estate/real properties while remaining anonymous (as described herein). The tokenized portions of real estate/real properties may be referred to herein as "asset tokens." The mechanisms by which the investors may trade and/or exchange tokenized portions of real estate/real properties may include tokenization and a dual ledger system. The transaction platform may facilitate a property owner to tokenize the property by generating multiple tokens collectively representing the value of the property. The transaction platform may facilitate investors to browse listed properties and tokens representing fractional shares of the value of one or more properties. The transaction platform may facilitate investors to acquire and transfer the tokens.

An exemplary aspect of the disclosed technology may include the transaction platform being specially configured and programmed to record token transactions in two semi-redundant ledgers on a computing network. One ledger, referred to herein as the "primary ledger," is configured to maintain data stored therein as confidential. The primary ledger may be internal to the transaction platform. In the primary ledger, asset token transactions may be recorded in association with personally identifiable information (PII) of the buyer and seller of the token. The transactions are also recorded in a public or private ledger, referred to herein as the "secondary ledger." The secondary ledger may be implemented as a blockchain. In certain aspects, the secondary ledger is configured to support immutable features. The secondary ledger may be configured to not store personally identifiable information (PII) of the buyer(s) or seller(s).

While exemplary aspects of the transaction platform are described herein with reference to an underlying real estate or real property asset, it should be understood that the technology disclosed herein may be applied to any type of underlying asset including, but not limited to, intangible assets.

An exemplary method of exchanging digital assets representing fractional interests in an asset includes receiving information regarding characteristics (e.g., size, location, calculated values, depreciation) of an asset and generating a plurality of digital assets representing fractional interests in the asset. The method also includes establishing a smart contract for exchanging at least one of the plurality of digital assets held by a first entity for trade proceeds from a second entity. The method additionally includes performing a transaction according to the smart contract, and updating a capitalization table based on the performed transaction. The method further includes recording data pertaining to the performed transaction on a blockchain.

Others may be notified of the information regarding characteristics of an asset. Others may be invited to propose an exchange for at least one of the plurality of digital assets representing fractional interests in the asset. A proposal of an exchange for at least one of the plurality of digital assets may be received. Establishing the smart contract for the exchange for at least one of the plurality of digital assets may be responsive to receiving the proposal of the exchange.

The method may further include waiting a predefined period of time after a current owner's acquisition of the asset prior to inviting others to propose an exchange for at least one of the plurality of digital assets representing fractional interests in the asset. Transaction fees may be collected from at least one of the first entity and the second entity, the transaction fees set according to the smart contract governing the performed transaction. At least some of the collected transaction fees may be distributed as license fees to a third entity. Settlement statements pertaining to the performed transaction may be distributed to at least one of the first entity and the second entity. The method may additionally include recording transaction data pertaining to the performed transaction, including personally identifiable information of at least one of the first entity or the second entity, in a primary ledger configured to maintain the transaction data as confidential, and recording transaction data pertaining to the performed transaction, absent personally identifiable information of the first entity and the second entity, in a secondary ledger configured to make the transaction data publicly or privately available on a blockchain. The asset may include real estate, for example, and the digital assets representing fractional interests in the asset may include nonfungible tokens (NFTs), and/or, but is not limited to, fungible tokens, hybrid tokens, cryptocurrencies, crypto tokens, crypto coins, security token, and asset tokens, having metadata including identification information of the buyer of the NFTs. The smart contract may be established by a broker/dealer with at least one of the first entity or the second entity.

An exemplary non-transitory computer readable medium stores computer-readable instructions executable by a hardware computing processor to perform operations of a method for recording transactions with semi-redundant ledgers as described herein.

An exemplary system for recording transactions with semi-redundant ledgers includes at least one device including a hardware computing processor, the system being configured to perform operations of a method for recording transactions with semi-redundant ledgers as described herein. The system may include a non-transitory memory having stored thereon computing instructions, executable by the hardware computing processor, to perform operations of a method for recording transactions with semi-redundant ledgers as described herein.

An exemplary system for recording transactions with semi-redundant ledgers includes at least one device including a hardware circuit operable to perform a function, the system being configured to perform operations of a method for recording transactions with semi-redundant ledgers as described herein.

According to certain aspects of the present disclosure, a computer-implemented method is provided. The method includes receiving a selection of a model from a plurality of models running on an ecosystem. The method includes receiving annotated datasets with correct examples and incorrect examples. The method includes training, responsive to receiving the annotated datasets, the model based on the annotated datasets. The method includes running the model based on the training. The method includes receiving a feedback score of results from running the model based on the annotated datasets. The method includes iteratively running, until the feedback score is above a predetermined threshold, the model responsive to user evaluation of the results from running the model based on the annotated datasets. The method includes publishing the model responsive to the feedback score being above the predetermined threshold.

According to certain aspects of the present disclosure, a system is provided. The system includes one or more memories comprising instructions and one or more processors configured to execute the instructions which, when executed, cause the one or more processors to receive a selection of a model from a plurality of models running on an ecosystem. The system includes one or more memories comprising instructions and one or more processors configured to execute the instructions which, when executed, cause the one or more processors to receive annotated datasets with correct examples and incorrect examples. The system includes one or more memories comprising instructions and one or more processors configured to execute the instructions which, when executed, cause the one or more processors to train, responsive to receiving the annotated datasets, the model based on the annotated datasets. The system includes one or more memories comprising instructions and one or more processors configured to execute the instructions which, when executed, cause the one or more processors to run the model based on the training. The system includes one or more memories comprising instructions and one or more processors configured to execute the instructions which, when executed, cause the one or more processors to receive a feedback score of results from running the model based on the annotated datasets. The system includes one or more memories comprising instructions and one or more processors configured to execute the instructions which, when executed, cause the one or more processors to iteratively run, until the feedback score is above a predetermined threshold, the model responsive to user evaluation of the results from running the model based on the annotated datasets. The system includes one or more memories comprising instructions and one or more processors configured to execute the instructions which, when executed, cause the one or more processors to publish the model responsive to the feedback score being above the predetermined threshold.

According to other aspects of the present disclosure, a non-transitory machine-readable storage medium comprising machine-readable instructions for causing a processor to execute a method is provided. The method includes receiving a selection of a model from a plurality of models running on an ecosystem. The method includes receiving annotated datasets with correct examples and incorrect examples. The method includes training, responsive to receiving the annotated datasets, the model based on the annotated datasets. The method includes running the model based on the training. The method includes receiving a feedback score of results from running the model based on the annotated datasets. The method includes iteratively running, until the feedback score is above a predetermined threshold, the model responsive to user evaluation of the results from running the model based on the annotated datasets. The method includes publishing the model responsive to the feedback score being above the predetermined threshold.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

Figure 1:
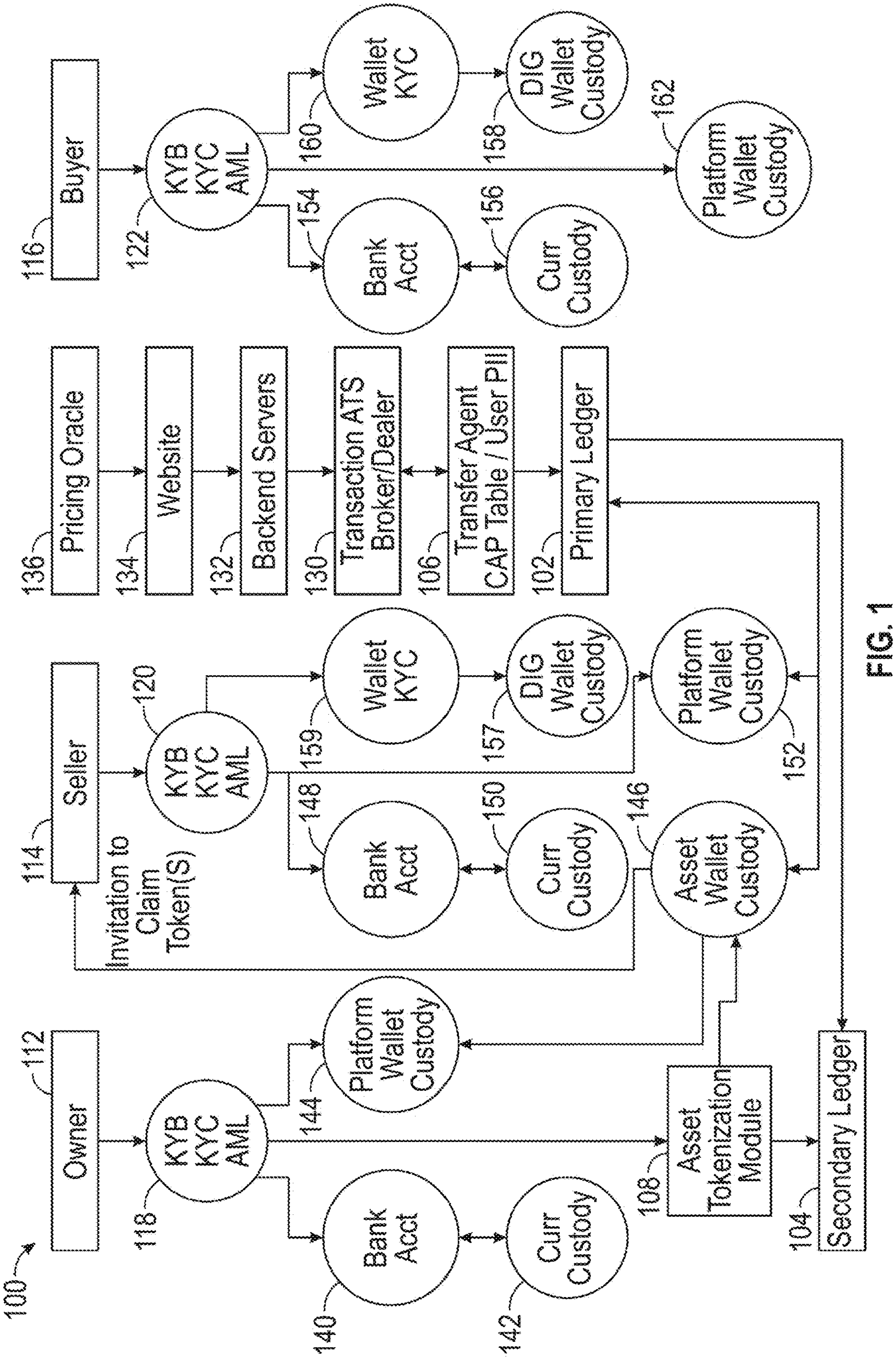
FIG. 1 is a block diagram illustrating an exemplary technological system including a transaction platform having semi-redundant ledgers.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The platform of the system 100 may automatically create and dynamically update (e.g., maintain) capitalization tables of assets underlying tokens exchanged on the platform, thereby addressing a long-standing pain point in businesses having investors for whom such capitalization tables must be manually created and revised whenever ownership changes occur. The automatic creation and live syncing maintenance of capitalization tables may facilitate their being continually up to date, complete, verified, and audit-ready (e.g., dynamically updated). For example, the platform of the system 100 may provide owners with a list of new investors in a tokenized asset based on the updated capitalization table, reflecting every buyer of the investors' tokens representing an interest in the underlying asset. The platform may also provide value to the transfer side via improved efficiency and the reduction of manual pain points in their business. The ease and simplicity with which the systems and methods of the platform described herein may be applied in practice may provide compelling inducements for industries traditionally slow to adopt new technology, e.g., commercial real estate, to adopt the technology disclosed herein for facilitating transaction processing for the benefit of buyers and sellers of digital assets representing fractional ownership in underlying assets, via the platform of the system 100, sponsors of investments in assets and/or owners of assets (e.g., real estate) may provide access to investments in such assets which may have previously been unavailable, for example, due to securities regulations and/or rules defining sophisticated and accredited investors. Retail investors and buyers of assets have traditionally been locked out of participating in commercial real estate investments because they lack the minimum investment threshold and/or do not have sufficient qualifications as traditional investors to acquire an interest in an asset from a Seller of the interest in the asset. The platform of the system 100 may establish a secondary exchange via which the asset tokens are exchanged in secondary trades, following any holding periods following the primary issuance of securities underlying the asset tokens as may be required by securities regulations (e.g., Rule 144), so the restrictions of the securities regulations pertaining to qualifications of the investors may not apply to the contemplated exchange of asset tokens. For example, the platform of the system 100 may unlock real estate investment opportunities for retail buyers, not only facilitating retail buyers to capture return on investment, but also to take advantage of potential tax savings, for example, via write-offs of depreciation of the underlying assets on tax returns. The disclosed technology platform that can create digital securities out of what are known as "real assets" and can function as a secondary market platform or Financial Exchange for these types of assets as well as for other types of assets such as, but not limited to, investments in franchises, investments in business that generate dividends or returns based on performance of the business or underlying asset, investments in ventures that capture or mine natural resource such as, but not limited to uranium, timber, and other commodities, private credit, private debt, intangible assets, tradeable assets, and any other types of appropriate assets.

FIG. 1 is a block diagram illustrating an exemplary technological system 100 including a transaction platform having semi-redundant ledgers, such as primary ledger 102 and secondary ledger 104. An owner 112, a seller 114, and a buyer 116 may each include computing and communication systems (e.g., an owner device, a seller device, and a buyer device, respectively) corresponding to and/or representing users interfacing with the system 100. The owner 112 may be an owner of an asset listed on the transaction platform and/or a sponsor of investments in an asset listed on the transaction platform, and may also be referred to as an asset owner or a property owner. The seller 114 may represent one who is selling or listing an asset as available for sale or exchange, e.g., available to be transferred to another user in exchange for something else (e.g., tokens, currency, etc.). The seller 114 may also be referred to as a seller when participating in a buy-sell transaction, for example. The buyer 116 may represent one who is seeking to purchase, buy, or acquire at least a partial interest in an asset which is listed (e.g., as available for sale or exchange) on the transaction platform. The buyer 116 may also be referred to as a buyer when participating in a buy-sell transaction, for example. The system 100 may perform verification of identification and related information for each of the users of the system 100 (e.g., including owner 112, seller 114, and/or buyer 116) via an online identity verification process, for example, a know your customer (KYC) verification process for an individual user, a know your business (KYB) verification process for any business entity, such as, but not limited to, limited liability company (LLC), C corporation, S corporation, and other appropriate business entities, and/or an anti-money laundering (AML) verification process. Each user of the system 100 may communicatively couple an electronic and/or computer-networked funding source and/or recipients of funds (e.g., financial institution account, bank account, credit union account, investment account, cryptocurrency account, digital wallet, and/or other provider or recipient of digital representations of currency and/or digital assets associated with a transaction processed by the transaction platform) to the system 100. Digital assets may include, but is not limited to, cryptocurrencies, crypto tokens, crypto coins, security token, asset tokens, non-fungible tokens (NFTs), fungible tokens, and/or other appropriate forms of digital assets. The electronic and/or computer-networked funding source and/or recipients of funds may include a computing system of one or more third-party accounts of users of the system 100. Sending and/or distributing fees and/or funds, receiving and/or collecting fees and/or funds, and exchanging assets for fees and/or funds as described herein may merely be illustrative examples of the technological systems and methods described herein which may be applied in addressing challenges in a variety of other contexts and applications, also. For example, the technological systems and methods described herein may provide novel systems and methods for transmitting and/or receiving transmissions of various types of digital content (e.g., digital bits and/or bytes storable in a computer-readable memory of the system 100) over a computing communication system associated with the system 100. In various non-limiting examples, including those described herein, the digital content transmitted and/or received by components of the systems and methods described herein may include digital representations of currency, cryptocurrency, NFTs, and/or digital assets such as written works, artwork, photographs, audio/video programs, music, digital blueprints, computer-aided design (CAD) files representing physical articles of manufacture, architectural designs, plats of survey, deeds to real property, stock and/or membership interests in business entities, executed contracts, ownership and/or membership interests in timeshare properties, co-op properties, travel/vacation clubs, recreational clubs, social clubs, etc. Additional examples of content could be valuation estimates, third party appraisals, proof of purchases, copies of insurance policies, profit and loss data, calendars and schedules, and performance data.

The transaction platform may include the primary ledger 102, a transfer agent 106, backend servers 132, and a website 134. While the primary ledger 102 and the transfer agent 106 are depicted as separate, it should be understood that, in certain aspects, the primary ledger 102 and the transfer agent 106 are included within the same service. The users may interact with the website 134 via a web browser app executing on the owner 112, the seller 114, and the buyer 116, all of which can be, but is not limited to, a desktop computer, laptop computer, tablet computer, personal digital assistant (PDA), cell phone, mobile phone, smart phone, and/or other computing devices including mobile devices. The transaction platform may be communicatively coupled with a transaction ATS broker/dealer module 130, a pricing oracle 136, and a secondary ledger 104. While, in some aspects, the primary ledger 102 is described as being centralized and the secondary ledger 104 as being decentralized, it should be understood that the primary ledger 102 could be decentralized. The primary ledger 102 and/or the secondary ledger 104 may be implemented with blockchain technology. The primary ledger 102 and secondary ledger 104 may be private or public. The primary ledger 102 and the secondary ledger 104 may include multiple copies of ledgers maintained on different computing nodes of computing networks implementing and/or supporting one or more public blockchain protocols, for example, but not limited to, Ethereum, Bitcoin, Binance Smart Chain (BSC), Cardano, Polkadot, Solana, Chainlink, Cosmos, TRON, HIVE, Polygon (Matic Network), and more.

In certain aspects, the primary ledger 102 can store all user personally identifiable information (PII) utilized by the system 100, as well as a capitalization table (also referred to as a cap table) that maintains the status of platform assets and transactions, including the capitalization of each asset (e.g., real property) listed on the platform (e.g., listed as available for transactions on the platform). The primary ledger 102 may be implemented as a Structured Query Language (SQL) database, for example. In certain aspects, the primary ledger 102 can be maintained by the transfer agent 106. The function of the transfer agent 106 may be unregulated. The transfer agent 106 may record transactions in the primary ledger 102. The transfer agent 106 may synchronize the primary ledger 102 and the secondary ledger 104. The transfer agent 106 may act as a gatekeeper and share information regarding transactions on the primary ledger 102 and/or the secondary ledger 104 only with authorized users and/or the transaction ATS broker/dealer module 130.

The transaction ATS broker/dealer module 130 may include computing and communication systems corresponding to and/or representing a registered broker, registered dealer, registered broker/dealer licensed by the US Securities and Exchange Commission, the Financial Industry Regulatory Agency (FINRA), other domestic/international regulatory or governmental agencies, and/or similar roles in various exemplary applications and/or jurisdictions in which the system 100 is utilized. The transaction ATS broker/dealer module 130 may interface with the system 100 to provide associated broker/dealer functionality on the transaction platform of the system 100. Functionality provided by the transaction ATS broker/dealer module 130 may be separate from functionality provided by other modules of the transaction platform, for example, due to regulatory requirements including those promulgated by the Financial Industry Regulatory Authority (FINRA). The transaction ATS broker/dealer module 130 may include an Alternative Trading System (ATS) and implementations (e.g., software, firmware, programmable logic arrays, electronic circuitry, etc.) of FINRA-compliant processes and methods for facilitating the transactions processed by the transaction platform as approved and licensed by FINRA. Functionality provided by the transaction ATS broker/dealer module 130 may be implemented in a virtual private cloud separate from other modules of the transaction platform. Firewalls may be established for the transaction ATS broker/dealer module 130 to be separate from and/or on a separate web services instance than other modules of the transaction platform. The transaction ATS broker/dealer module 130 may provide functionality to introduce buyers 116 and sellers 114 to each other, to generate smart contracts, to settle transactions facilitated by the transaction platform, distribute fees associated with the transactions facilitated by the transaction platform to appropriate participants in the system 100, and/or to act as a gatekeeper of transactions facilitated by the transaction platform. Smart contracts are digital contracts that automatically execute, control or document events and actions according to the terms of a contract or an agreement. Fees generated from activities on the transaction platform during an acquisition/transfer transaction (e.g., buy-sell transaction, acquisition transaction, merger transaction, etc.) may be collected and/or distributed by the transaction ATS broker/dealer module 130, for example, according to rules, agreements, and/or smart contracts associated with the transaction facilitated by the transaction platform. Fees generated from activities and/or participants of the system 100 outside the transaction ATS broker/dealer module 130 (e.g., from other participants of the transaction platform and/or any third-party system that is not included in the transaction platform of the system 100) may be processed and collected by the transaction platform.

The transaction ATS broker/dealer module 130 may request payment of fees (e.g., fees associated with a transaction facilitated by the transaction platform of the system 100) via third-party custody account(s) of the buyer 116. The transaction ATS broker/dealer module 130 may deduct funds sufficient to cover the fees from proceeds of the transaction to pay seller fees (e.g., fees payable to the seller 114) as stipulated by and/or agreed to by the seller 114 in a smart contract associated with the transaction as part of a process of listing a token as available for an exchange transaction facilitated by the transaction platform. A computing system of the third-party custody account(s) may send funds to cover the fees to the transaction ATS broker/dealer module 130 at which time the transaction ATS broker/dealer module 130 may keep the funds covering the fees. The transaction ATS broker/dealer module 130 may disburse funds covering a licensing fee for the transaction platform to one or more entities due those fees. The transaction ATS broker/dealer module 130 may disburse funds covering a partnership fee to the transfer agent 106. The transaction ATS broker/dealer module 130 may generate and/or distribute a final settlement statement to the buyer 116 and seller 114. In the event of any errors, omissions, glitches, or problems associated with the transaction processed by the transaction platform, the transaction ATS broker/dealer module 130 may notify a designated third party of the event for appropriate remediation. The transaction ATS broker/dealer module 130 may include one or more maintenance and support modules via which remediation, updates, upgrades, and/or support may be provided via a third-party computing system communicatively coupled with the transaction ATS broker/dealer module 130.

The pricing oracle 136 may include a third-party service that connects smart contracts in the transaction platform of the system 100 with third-party entities and third-party systems outside of the system 100. The pricing oracle 136 may provide a user of the system 100 with an estimate of the current value of an asset. The pricing oracle 136 may facilitate calculations and computations based on the estimate as directed by the user. The user may modify inputs to the pricing oracle 136 to utilize the pricing oracle 136 for determining the user's own market pricing estimates. For example, the buyer 116 may modify inputs to the pricing oracle 136 to utilize the pricing oracle 136 for estimating a future value of their investment in an asset and determining an amount of funds the buyer 116 may agree to exchange for the asset on a given day. The seller 114 may transmit information indicating agreement with pricing data provided by the pricing oracle 136, or the seller 114 may transmit information that overrides the pricing data provided by the pricing oracle 136. For example, in the context of commercial real estate assets, the pricing oracle 136 may include a digital broker opinion of value (BOV).

In an example, an owner 112 (e.g., real estate property owner) may authenticate with the system 100 according to KYB KYC AML 118 protocols and methodologies. The owner 112 may link a bank account 140 and a currency custody module 142 to the system 100. The currency custody module 142 may serve as a custodian for the owner 112's currency on the system 100. The currency custody module 142 may be configured to hold fiat currency, for example, US dollars ($) or other forms of fiat currency. A platform digital wallet custody module 144 may serve as a custodian for the owner 112's digital assets on the system 100.

In the example, a seller 114 may authenticate with the system 100 according to KYB KYC AML 120 protocols and methodologies. In some examples, the owner 112 and the seller 114 may be the same individual or entity playing the different roles in a transaction, while in other examples, the owner 112 and the seller 114 may be different individuals or entities, for example, if the seller 114 is a broker or agent engaged by the owner 112 to list and/or transfer the property on the transaction platform of the system 100 on their behalf. The seller 114 may link a bank account 148 and a currency custody module 150 to system 100. The currency custody module 150 may serve as a custodian for the seller 114's fiat currency on the system 100. A digital wallet custody module 157 may serve as a custodian for the seller 114's digital assets on the system 100. These digital assets may include cryptocurrency, e.g., USDC tokens and any other crypto currencies. The digital wallet custody module 157 may authenticate with the system 100 according to wallet KYC 159 protocols and methodologies. The digital wallet custody module 157 may also include functionality and/or an interface to convert or exchange the digital currency held thereby into fiat currency for the benefit of the seller 114. Conversions or exchanges of the cryptocurrency held by the digital wallet custody module 157 to fiat currency may be documented by a transaction entry in the primary ledger 102 and the secondary ledger 104. A platform digital wallet custody module 152 may serve as a custodian for the seller 114's digital assets on the system 100, including the digital assets which the seller 114 transfers on behalf of a separate owner (e.g., via a broker or agency relationship) and the digital assets which the seller 114 transfers on its own behalf as also owner 112 of the digital assets.

An asset tokenization module 108 may generate one or more digital assets representing an asset and/or a value of an asset, for example, a real estate property owned by the owner 112, and store the generated digital assets in an asset wallet custody module 146. The asset wallet custody module 146 may transmit data to the primary ledger 102 and the secondary ledger 104 for recording the generation of the digital assets on the secondary ledger 104. The asset wallet custody module 146 may transmit the digital assets to the owner 112's platform digital wallet custody module 144 and provide data to the transfer agent 106 to record in the primary ledger 102 regarding the creation and/or transfer of the digital assets generated by the asset tokenization module 108. The asset wallet custody module 146 may transmit an invitation to the seller 114 to claim the digital assets generated by the asset tokenization module 108. When the seller 114 claims or retrieves its associated portion of the digital assets generated by the asset tokenization module 108 that is stored in the asset wallet custody module 146, for example, if the seller 114 is going to trade its associated portion of the digital assets generated by the asset tokenization module 108 on the system 100, then the asset wallet custody module 146 may transmit the digital assets to the seller 114's platform digital wallet custody module 152 and transmit information regarding the transfer to the transfer agent 106 for recording on the primary ledger 102. In certain other aspects, instead of transmitting an invitation to the seller 114, the asset wallet custody module 146 can transmit the digital assets generated by the asset tokenization module 108 directly to the seller 114's asset wallet custody module 146.

In an example, a buyer 116 may authenticate with the system 100 according to KYB KYC AML 122 protocols and methodologies. The buyer 116 may link a bank account 154 and a currency custody module 156 to the system 100. The currency custody module 156 may serve as a custodian for the buyer 116's fiat currency on the system 100. A digital wallet custody module 158 may serve as a custodian for the buyer 116's digital assets on the system 100. These digital assets may include cryptocurrency, e.g., USDC tokens and any other crypto currencies. The digital wallet custody module 158 may authenticate with the system 100 according to wallet KYC 160 protocols and methodologies. The digital wallet custody module 158 may also include functionality and/or an interface to convert or exchange the digital currency held thereby into fiat currency for the benefit of the buyer 116. Conversions or exchanges of the cryptocurrency held by the digital wallet custody module 158 to fiat currency may be documented by a transaction entry in the secondary ledger 104. A platform digital wallet custody module 162 may serve as a custodian for the buyer 116's digital assets on the system 100, for example, shares in tokenized assets generated by the asset tokenization module 108.

In an example, the buyer 116 may see that the seller 114 has listed its associated portion the digital assets generated by the asset tokenization module 108 that is stored in the asset wallet custody module 146 represented by one or more digital assets on the website 134 and engages in a transaction processed by the system 100 to exchange currency via the currency custody module 156 and/or digital assets via the digital wallet custody module 158 for digital assets generated by the asset tokenization module 108 representing the asset in which the buyer 116 is interested. The seller 114 may receive currency and/or digital assets from the buyer 116's currency custody module 156 and/or digital wallet custody module 158, while the buyer 116 may receive digital assets, representing the asset from the seller 114's platform digital wallet custody module 152, into the buyer 116's platform digital wallet custody module 162. Data regarding the transfer may be transmitted to the transfer agent 106 for recording on the primary ledger 102 as well as on the secondary ledger 104.

Figure 2:
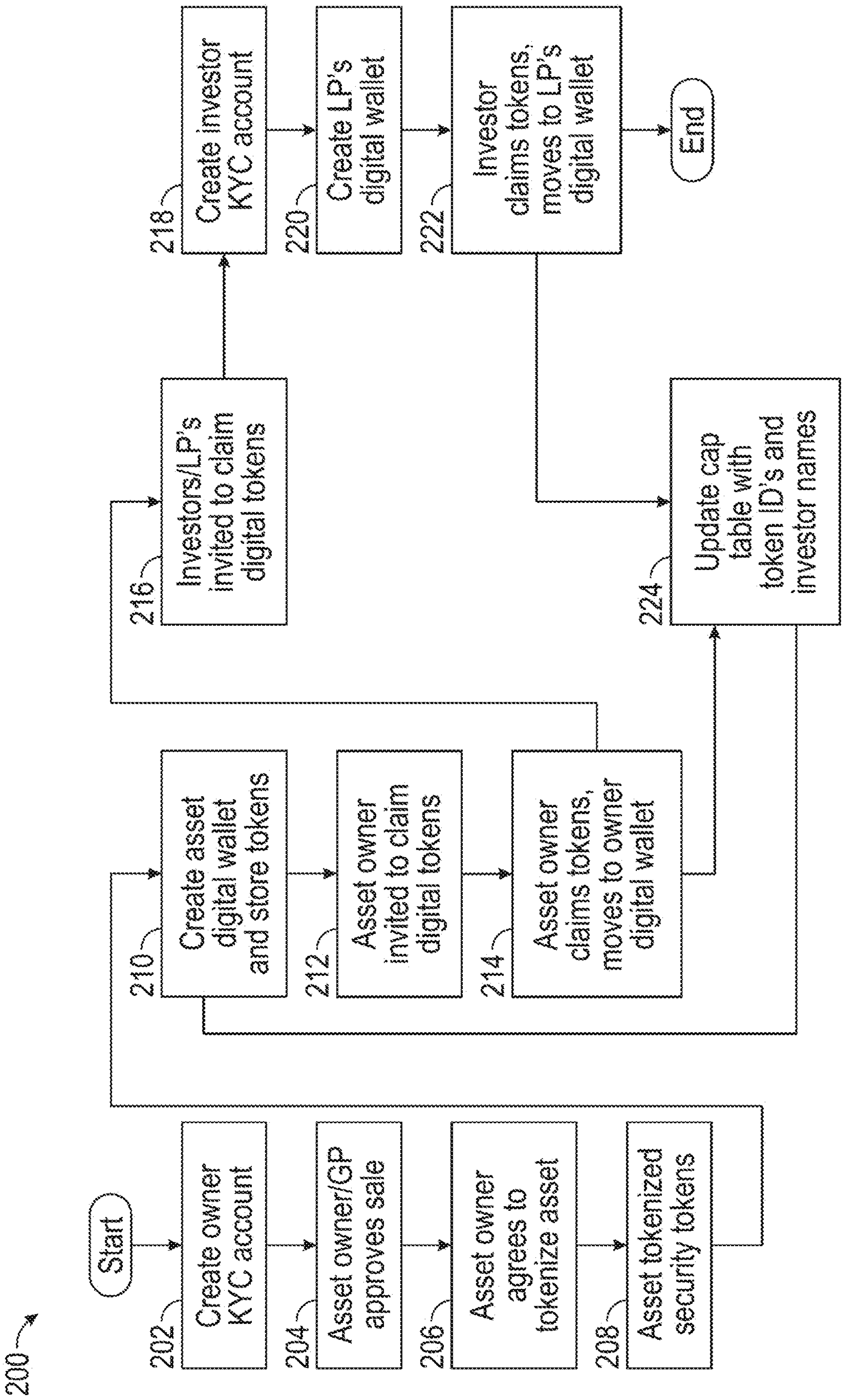
FIG. 2 illustrates an exemplary process for tokenization of an asset, according to some embodiments of the disclosed technology.

FIG. 2 illustrates an exemplary process 200 for tokenization of an asset, according to some embodiments of the disclosed technology. There are two types of participants in the process 200. One is an owner, (e.g., an asset holder), such as the owner 112, who may also be referred to as a sponsor or general partner (GP). The other is an investor, also referred to as a limited partner (LP). The investor may be a current investor in the asset or an investor who wants to invest in the asset. The investor may also be referred to as the buyer, such as the buyer 116.

Initially (e.g., at or prior to "START"), the participants (e.g., users) may be onboarded with the system 100 as discussed with reference to FIG. 1, and the process 200 that the participants undergo to become onboarded with the system 100 is described in detail below. For example, the owner (e.g., may be GP) may undergo a KYB process and a KYC account for the owner 112 may be created with the system 100 (operation 202). The owner 112 may approve sale of the asset using the system 100 (operation 204) to generate a smart contract memorializing agreement to sell and list. After the owner 112 agrees to tokenize an asset (operation 206), the system 100 may tokenize the asset as security tokens (operation 208), for example, or as other digital assets including, but is not limited to, nonfungible tokens (NFTs), fungible tokens, hybrid tokens, cryptocurrencies, crypto tokens, crypto coins, security token, and asset tokens, having metadata including identification information of the buyer of the NFTs. The security tokens may include, for example, ERC 1400 tokens. The security tokens may be fungible tokens or non-fungible tokens, which are unique and differentiated from other tokens representing a share of value in the asset, and may store associated meta data. In various examples, other digital asset types may be used. The security tokens created may include tokens designated as being owned by the GP and tokens owned by each of the investors or LPs who also hold an interest in the asset.

In the example of FIG. 2, an asset having a net value of $1,000,000 may be tokenized as 1,000 tokens, each token having a value of $1,000. In this example, the net value of the asset may be taken into account any debt by which the asset is burdened. In other words, an asset having a market value of $2,000,000, and a mortgage securing a debt of $1,000,000 recorded as a lien against the asset, may have a net value of $1,000,000. An asset having a market value of $1,000,000, and no debt against the asset, may have a net value of $1,000,000.

These tokens may be sent by the transfer agent 106 to a platform digital wallet, such as the platform digital wallet custody module 152, created for the asset (operation 210), and the capitalization table for the asset may be updated by the transfer agent 106 to reflect moving the tokens (operation 224). An identification number (ID) identifying the unique tokens may be included in the capitalization table along with the token's owner or investor's identification information. The platform digital wallet may be held by the system 100 or a third party.

The system 100 may invite the GP to claim the tokens (operation 212). When the GP claims the tokens, they may be moved from the platform wallet to the GP's digital wallet (operation 214), and the capitalization table may be updated to reflect the move (operation 224). The tokens claimed by the GP are only the GP's tokens, not investors' (LP's) tokens. The GP may then invite the investors (LPs) to claim their tokens (operation 216). Once the LPs claim their tokens, the LPs may be free to conduct transactions on the system 100 using the tokens, for example, transferring their tokens or exchanging their tokens for other items of value, for example, other tokens representing interests in other assets. If an LP who wishes to claim their tokens is not registered or onboarded onto the system 100, the LP may undergo a KYC process to create an investor account with the platform on the system 100 (operation 218) and create the LP's digital wallet (operation 220). The LPs may then claim their tokens, which may then be moved from the platform asset digital wallet (which may have been holding the tokens since they were created in operation 208) to the LP wallets (operation 222), and the capitalization table may be updated to reflect the moves (operation 224). For example, the capitalization table may associate the token identifiers (IDs) with the names of the LPs.

When the capitalization table is updated (operation 224), the capitalization table may be updated in the primary ledger on the blockchain by the system 100. The system 100 may also update the secondary ledger to match the primary ledger. PII about the GP or LPs may be withheld from and not stored in the secondary ledger. For example, instead of an LP name, the secondary ledger may associate token IDs with a hash value that is unique to the LP. In this manner, the blockchain transaction may be linked to the LP, while the LP may remain anonymous. The primary and secondary ledgers 102, 104 may be correlated using a database within the platform of the system 100.

Figure 3:
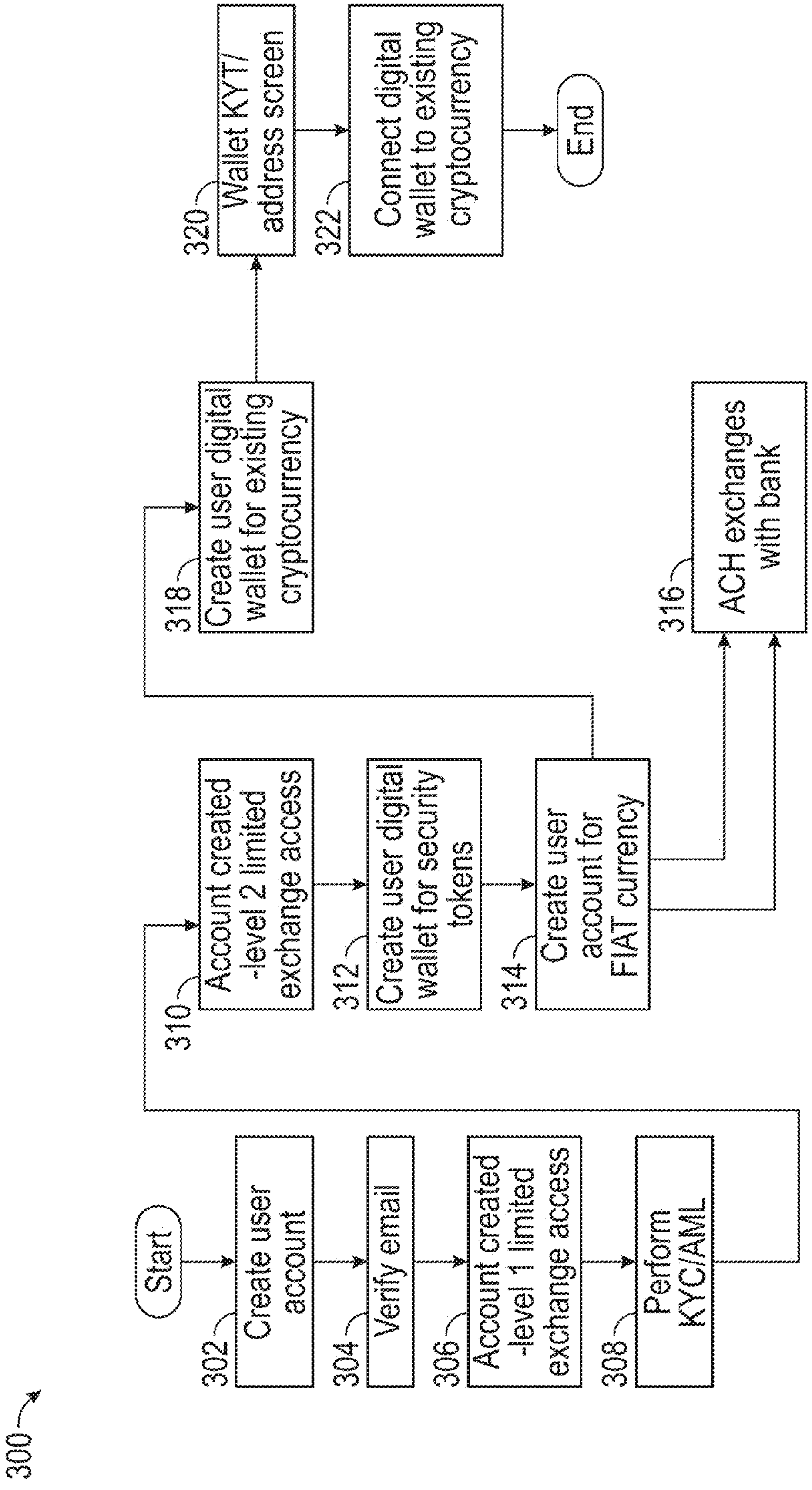
FIG. 3 illustrates an exemplary process for user onboarding and account creation, according to some embodiments of the disclosed technology.

FIG. 3 illustrates an exemplary process 300 for user (e.g., the owner 112, the seller 114, or the buyer 116) onboarding and account creation, according to some embodiments of the disclosed technology. For a new user, e.g., the owner 112, the seller 114, or the buyer 116, the platform of the system 100 may first perform a light account creation with the user's name, email address, and password (operation 302). The platform may then verify the user's email address (operation 304), for example, by emailing a verification link to the user's email address, which the user may click or follow to verify the user's email address with the platform.

After successful email verification, the platform of the system 100 may perform a level 1 account creation for the user (operation 306). The level 1 account may provide limited access to the exchange, for example, authorizing the user to browse tokenized assets, but not to acquire or exchange the tokens created to represent the tokenized assets.

A user may gain level 2 access by successfully completing the KYB/KYC/AML process (operation 308). The platform may create a level 2 access account for the user to provide the user with full exchange access (operation 310), which may include all access of the level 1 access plus full access to the exchange, for example, authorizing the user to acquire and/or exchange tokens created to represent tokenized assets. Upon successful completion of the KYB/KYC/AML process, the platform of the system 100 may also create multiple digital wallets or financial holdings accounts for the user, for example: a digital security wallet to hold digital assets (operation 312), a fiat account to hold fiat currency (operation 314), and a digital currency wallet to hold cryptocurrency tokens (operation 318). The user's digital currency wallet may receive and/or transmit cryptocurrency tokens from/to digital currency wallets and/or accounts off of the platform of the system 100. The user may fund the user's fiat account, for example, via an ACH transfer or ACH exchange with a bank (operation 316). The user may also transfer fiat currency from the user's fiat account on the platform of the system 100 to a bank external to the system 100 via an ACH transfer (operation 316).

With reference to operation 318, the level 2 account may facilitate the user (e.g., the buyer 116) to acquire and exchange tokens on the platform of the system 100. When the user (e.g., the buyer 116) acquires an asset token from a seller 114, funds may be transferred out of the user's (e.g., buyer's) fiat account (e.g., the currency custody module 156) and/or the digital wallet custody module 158 to the seller's fiat account (e.g., the currency custody module 150) and/or the digital wallet custody module 157, respectively, and the asset token may be moved from the owner's or seller's digital wallet for security tokens (e.g., platform digital wallet custody module 144 and platform digital wallet custody module 152, respectively) to the user's digital token wallet (e.g., platform digital wallet custody module 162). When the user (e.g., the seller 114) transfers an asset token to a buyer 116, funds may be transferred into the user's fiat account (e.g., the seller 114's currency custody module 150) from the buyer's fiat account (e.g., the currency custody module 156), and the asset token may be moved out of the user's token wallet (e.g., the seller 114's platform digital wallet custody module 152) and into the buyer's token wallet (e.g., the platform digital wallet custody module 162). In certain aspects, the user's account(s) on the platform of the system 100 may earn dividends, and the earned dividends may be moved into the user's fiat account when in the form of fiat currency or into the user's digital currency wallet when in the form of a cryptocurrency. Note that on the platform of the system 100, asset tokens may be purchased by and/or sold for any or a variety different forms of fiat currency and/or cryptocurrency, or combinations thereof. Likewise, in such aspects, the dividends may be earned and paid to a user's account in a variety different forms of fiat currency and/or cryptocurrency, or combinations thereof.

Some users may purchase asset tokens using cryptocurrency, as described in detail below. Such a user may first successfully complete a wallet know-your-transaction (KYT) process, such as a security process, and address screen (operation 320) to ensure the authenticity and security of the user's existing cryptocurrency. The platform of the system 100 may then connect the digital currency wallet to an external cryptocurrency digital wallet for the user (operation 322) based on determining that the authenticity and security are proper. The user may then transfer cryptocurrency from an off-platform digital wallet to the user's on-platform cryptocurrency digital wallet. In certain aspects, the security process is continually monitoring the digital currency wallet to determine proper authenticity and security.

When the user acquires an asset token on the platform of the system 100 using cryptocurrency, cryptocurrency may be transferred from the user's crypto wallet to the platform crypto wallet and the asset token may be moved to the user's token wallet. When the user transfers an asset token on the platform of the system 100 using cryptocurrency, cryptocurrency may be transferred into the user's crypto wallet from the platform crypto wallet and the asset token may be moved out of the user token wallet. In either case, the platform may settle the transaction with the counterparty, either in cryptocurrency or fiat currency.

Figure 4:
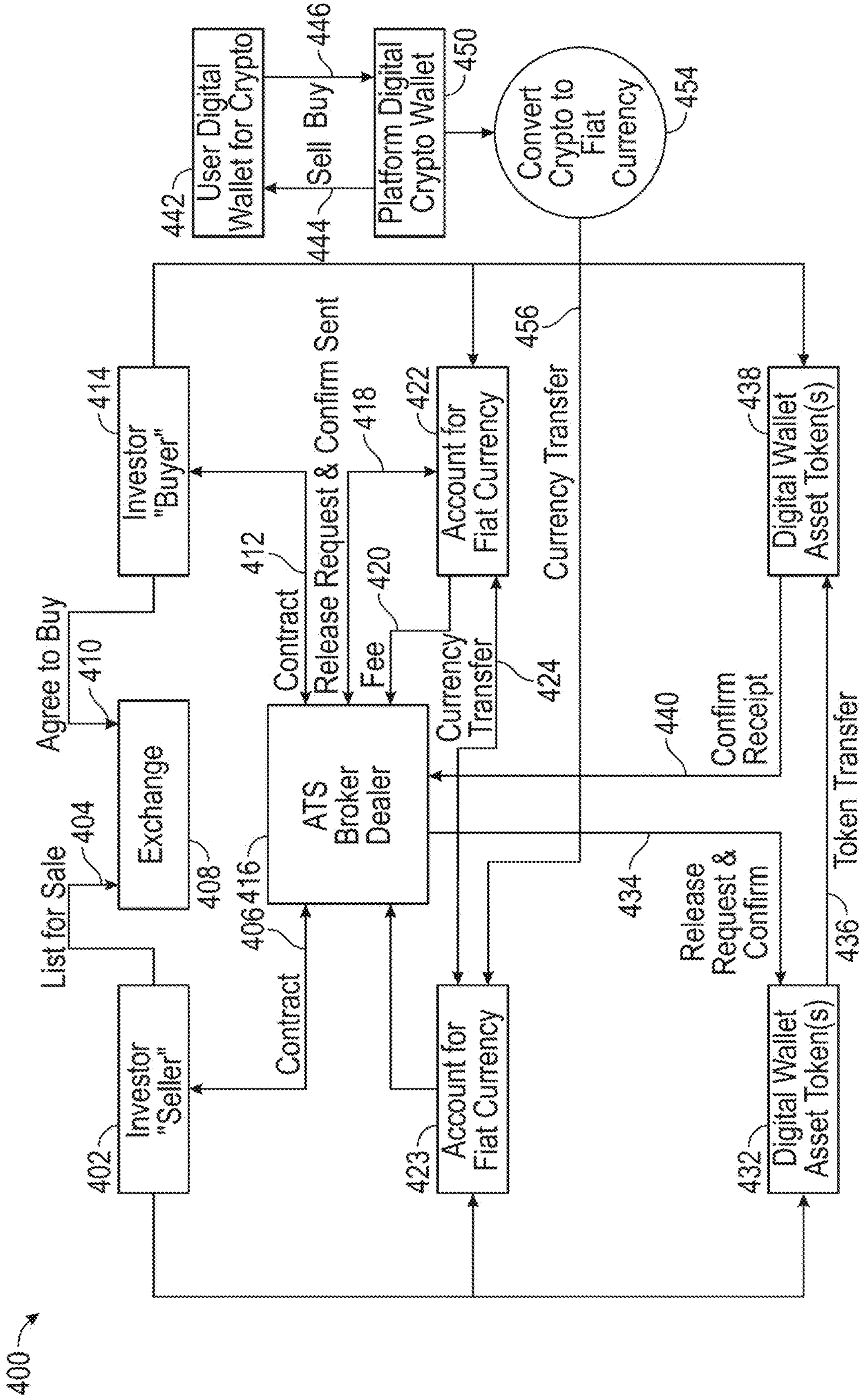
FIG. 4 illustrates an exemplary process for acquiring and transferring asset tokens on the transaction platform of FIG. 1, according to some embodiments of the disclosed technology.

FIG. 4 illustrates an exemplary process 400 for acquiring and transferring asset tokens on the transaction platform of the system 100, according to some embodiments of the disclosed technology. A first investor (illustrated at block 402), referred to herein as the "seller," such as the seller 114, holds an asset token in the seller's asset wallet (e.g., the platform digital wallet custody module 152), as depicted at block 432. The seller 114 requests (404) the asset token be listed for sale on the exchange, as illustrated at block 408. In response, the platform informs the broker/dealer (at block 416), such as the transaction ATS broker/dealer module 130, which generates a corresponding seller smart contract, and sends that seller smart contract to the seller for acceptance (shown at 406).

A second investor (depicted at block 414), referred to herein as the "buyer," such as the buyer 116, agrees (at 410) to acquire the asset token. In response, the platform informs the broker/dealer (at block 416), which generates a corresponding buyer smart contract, and sends (at 412) that buyer smart contract to the buyer (depicted at block 414) for acceptance.

The broker/dealer (at block 416) may perform a verification of funds available in the buyer's accounts, for example, to ensure that the buyer has a sufficiently high balance to complete the transaction. If not, the platform of the system 100 may send the buyer a request to add additional currency (e.g., fiat currency, cryptocurrency, tokens, and/or other digital representations of value offered to complete the transaction) to their platform account(s) being used to provide items of sufficient value in exchange for the acquisition. The platform of the system 100 may send a release request (at 418) to the buyer's fiat account (block 422), such as the currency custody module 156, to transfer the required amount of fiat currency from the buyer's fiat account (block 422) to the seller's fiat account (block 423), such as the currency custody module 150 via currency transfers (424). The purchase price amount may be transferred from the buyer's fiat account to the seller's fiat account, minus a service fee (at 420) associated with the acquisition. For example, if there was a purchase of $1000 and a fee of $50, there would be a transfer of $950 from the buyer's fiat account to the seller's fiat account, and a transfer of $50 from the buyer's fiat account to the broker dealer (at block 416). A service fee may be transferred from the buyer's fiat account to the broker/dealer. On receipt of the required amount into the seller's fiat account (at block 423), the platform may inform the broker/dealer.

Process steps may be taken to protect the token from being transferred to another other than the buyer during the process of the buyer acquiring the token, being delisted from the platform, or otherwise being tampered or interfered with during the process of the buyer acquiring the token. For example, at approximately the same time as the release request (at 418) sent by the platform to the buyer's fiat account (at block 422), a second release request (at 434) may be sent to the seller's asset token wallet (at block 432) to hold the asset token for the buyer. This process may protect the buyer's currency by ensuring the buyer receives the asset token in exchange for the currency transferred to the seller of the asset token, by preventing the seller from interrupting the transfer of the asset token once the seller has accepted the terms to transfer the asset token. On receipt of the agreed-upon amount of currency (e.g., fiat currency, cryptocurrency, etc.) into the seller's corresponding account, the platform of the system 100 may transmit a confirmation of receipt to the seller's asset token wallet. In response to receiving the confirmation of receipt of the currency, the seller's asset token wallet (at block 432) may transfer (at 436) the asset token to the buyer's asset token wallet (at block 438), such as the platform digital wallet custody module 162. Upon receipt of the asset token, the buyer's asset token wallet (at block 438) may transmit (at 440) confirmation of receipt of the asset token to the broker/dealer (at block 416), thereby completing the transaction. The platform of the system 100 may update the capitalization table in the primary ledger, such as the primary ledger 102 (shown in FIG. 1), to reflect the transaction, and update the secondary ledger, such as the secondary ledger 104 (shown in FIG. 1), accordingly.

Although the acquire/transfer process has been described herein largely in terms of the exchange of fiat currency, either or both of the buyer and seller may use other digital representations of value (e.g., cryptocurrency or other digital tokens) instead of, or in addition to, fiat currency. The platform of the system 100 may perform any conversions (at 454) between fiat currency, cryptocurrency, and/or other digital tokens as appropriate to facilitate and complete the transactions (444, 446) on the transaction platform of the system 100.

Figure 5:
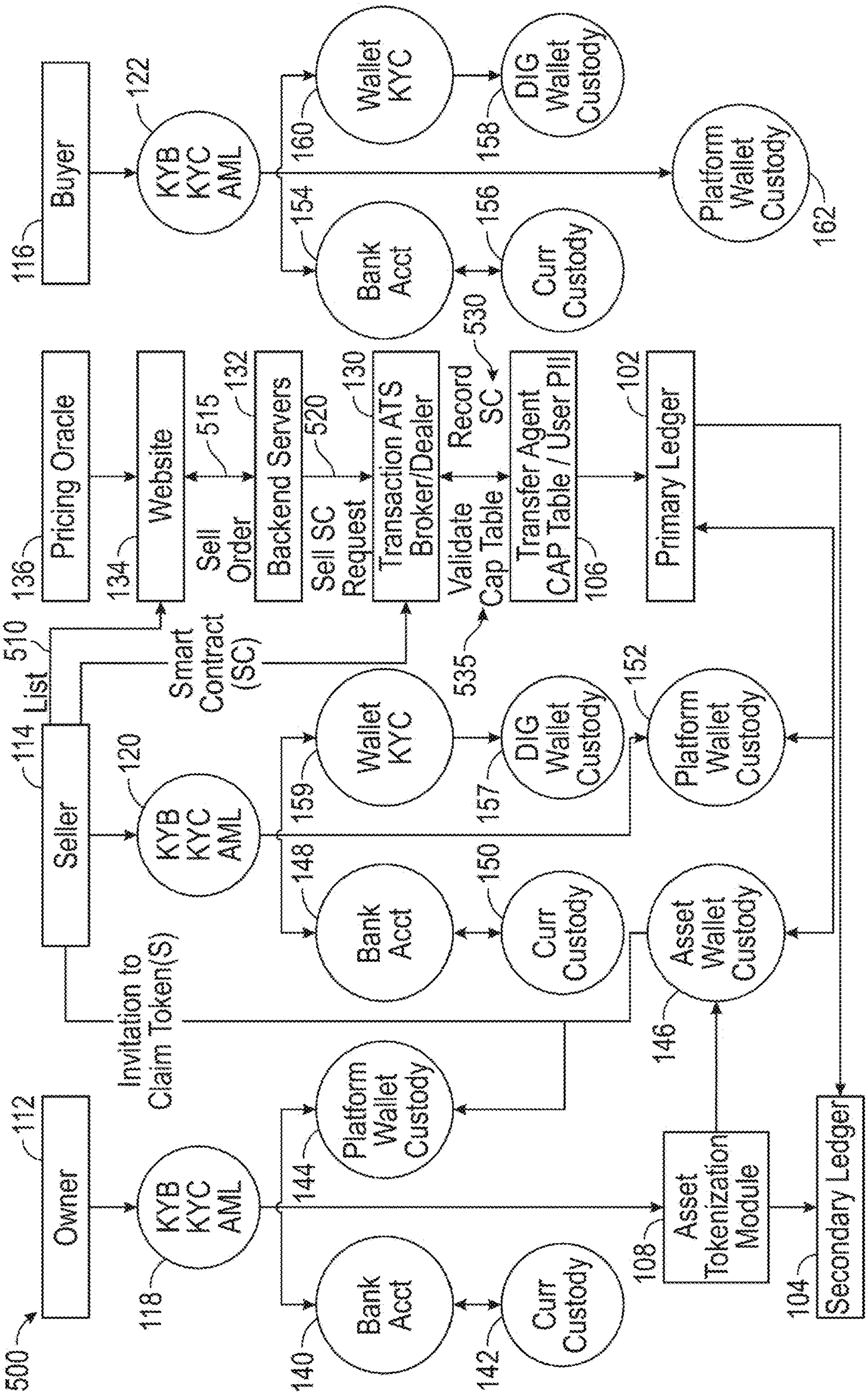
FIG. 5 illustrates an exemplary seller login and transaction flow using the exemplary transaction platform of the system of FIG. 1.

FIG. 5 illustrates an exemplary seller login and transaction flow 500 using the exemplary transaction platform of the system 100. A seller 114 may register with and log into the system 100 and be authenticated as an authorized user of the system 100 according to KYB KYC AML 120 protocols and methodologies. The seller 114 may link a bank account 148 and a currency custody module 150 to system 100. The currency custody module 150 may serve as a custodian for the seller 114's fiat currency on the system 100. A platform digital wallet custody module 152 may serve as a custodian for the seller 114's digital assets on the system 100. The seller 114 may receive, from the asset wallet custody module 146, an invitation 505 to claim digital assets generated by the asset tokenization module 108 to represent investors' shares in an asset tokenized by the asset tokenization module 108. An example of such an asset may include real property, e.g., commercial real estate. When the seller 114 claims the digital assets generated by the asset tokenization module 108, for example, if the seller 114 is going to trade the digital crypto tokens generated by the asset tokenization module 108 on the system 100, the asset wallet custody module 146 may transmit the digital assets to the seller 114's platform digital wallet custody module 152 and transmit information regarding the transfer to the transfer agent 106 for recording on the primary ledger 102 as well as on the secondary ledger 104 without recording any PII thereon.

The seller 114 may then list 510 the asset and/or asset tokens on the transaction platform of the system 100 as being available for sale, purchase, exchange, investing in, transferring, or any other appropriate listing action. The seller 114 may list 510 the asset and/or asset tokens via the website 134, for example, using the website 134 as an interface to the transaction platform of the system 100 to make the listing. The website 134 may include a list of assets and/or asset tokens that are available on the transaction platform, and the act of listing 510 the asset and/or asset tokens may include the listed asset and/or asset tokens in the website 134's list of assets and/or asset tokens that are available on the transaction platform.

Responsive to the listing 510 of the asset and/or asset tokens via the website 134, a sell order 515 may be generated by the website 134, the backend servers 132 (which may host or control at least some aspects of the website 134), and/or a combination of the website 134 and the backend servers 132 in conjunction with one another. The sell order may be an order to request creation of a smart contract (SC) 525 to facilitate a sale, purchase, exchange, investment in, transferring of, or similar type of disposition of the asset and/or asset tokens. In response to receiving the sell order 515, the backend servers 132 may generate and transmit a sell SC request 520 to the transaction ATS broker/dealer module 130 to request the creation of the SC 525 between the transaction ATS broker/dealer module 130 and the seller 114. The transaction ATS broker/dealer module 130 may establish the SC 525 with the seller 114 for the contemplated transaction involving the asset and/or asset tokens transferred to the platform digital wallet custody module 152. The transaction ATS broker/dealer module 130 may record the smart contract (operation 530) and update and/or validate the capitalization (cap) table (operation 535) via the transfer agent 106, for example, based on the SC 525 and/or the asset tokens transferred to the platform digital wallet custody module 152 by the asset wallet custody module 146. The transfer agent 106 may include and/or utilize user PII of the seller 114 and/or the owner 112 in the update and/or validation of the cap table. The transfer agent 106 may maintain an up-to-date copy of the cap table and related user PII. The transfer agent 106 may update the cap table and/or related user PII based on input provided via the website 134 and routed to the transfer agent 106 via the backend servers 132 and/or transaction ATS broker/dealer module 130. The transfer agent 106 records the smart contract 525 as well as entries pertaining to the contemplated and performed transactions involving the asset and/or asset tokens in both the primary ledger 102 and the secondary ledger 104.

Figure 6:
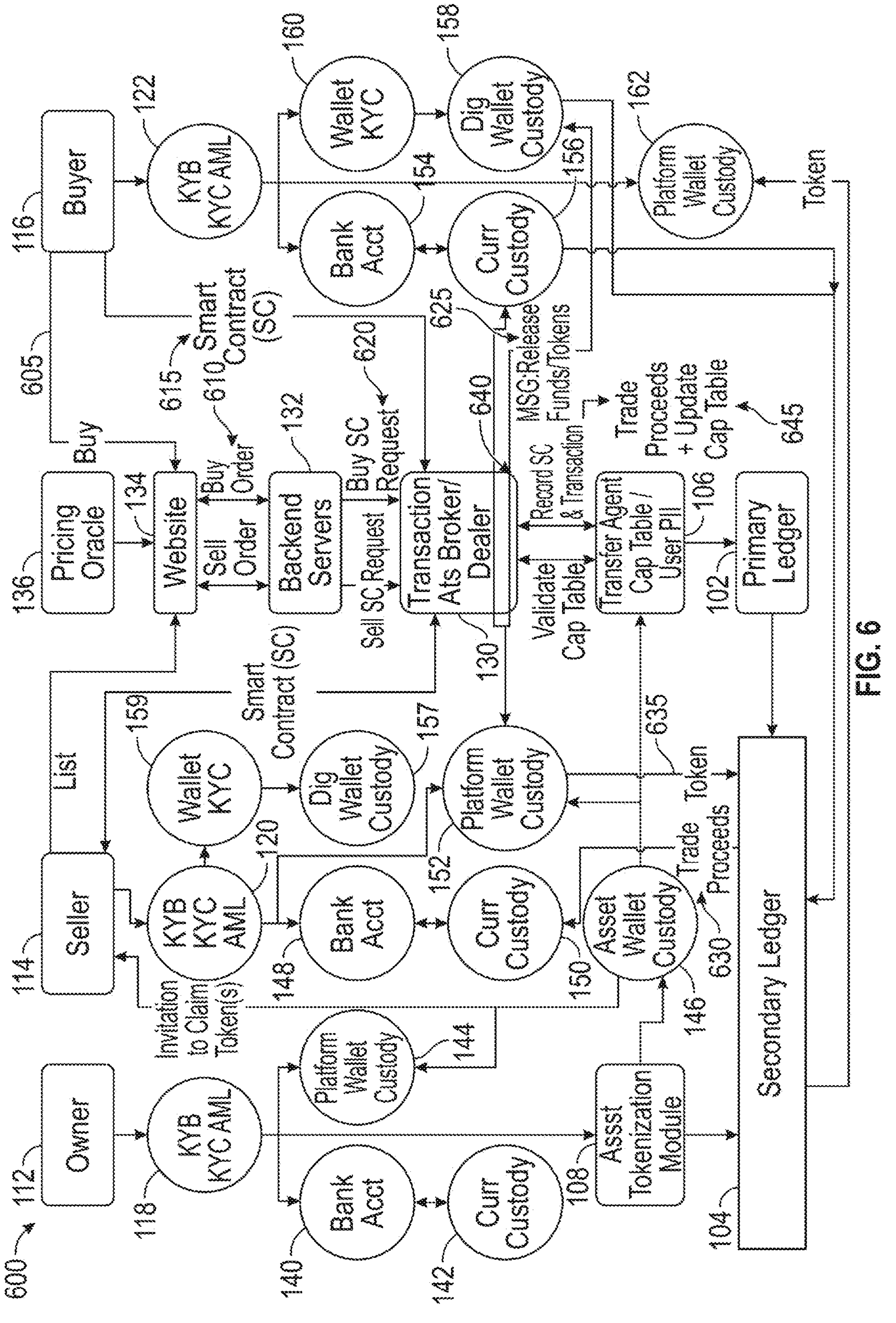
FIG. 6 illustrates an exemplary buyer login and transaction flow 600 using the exemplary transaction platform of the system of FIG. 1.

FIG. 6 illustrates an exemplary buyer login and transaction flow 600 using the exemplary transaction platform of the system 100. A buyer 116 may register with and log into the system 100 and be authenticated as an authorized user of the system 100 according to KYB KYC AML 122 protocols and methodologies. The buyer 116 may link a bank account 154 and a currency custody module 156 to system 100. The currency custody module 156 may serve as a custodian for the buyer 116's fiat currency on the system 100. A digital wallet custody module 158 may serve as a custodian for the buyer 116's digital assets on the system 100. These digital assets may include cryptocurrency, e.g., USDC tokens and/or other appropriate digital assets. The digital wallet custody module 158 may authenticate with the system 100 according to wallet KYC 160 protocols and methodologies. The digital wallet custody module 158 may also include functionality and/or an interface to convert or exchange the digital currency held thereby into fiat currency for the benefit of the buyer 116, if desired. Conversions or exchanges of the cryptocurrency held by the digital wallet custody module 158 to fiat currency may be documented by a transaction entry in the both the primary ledger 102 and the secondary ledger 104. A platform digital wallet custody module 162 may serve as a custodian for the buyer's asset tokens to be acquired on the system 100 by the buyer 116.

The buyer 116 may view the listed asset and/or asset tokens on the transaction platform of the system 100 as being available for sale, purchase, exchange, investing in, transferring, or the like via the website 134. Responsive to viewing the listing of the asset and/or asset tokens via the website 134, the buyer 116 may make an offer to buy 605 the listed asset and/or asset tokens via the website 134. Responsive to the buyer 116's offer to buy 605 the listed asset and/or asset tokens, a buy order 610 may be generated by the website 134, the backend servers 132 (which may host or control at least some aspects of the website 134), and/or a combination of the website 134 and the backend servers 132 in conjunction with one another. The buy order 610 may be an order to request creation of a create a smart contract (SC) 615 to facilitate a sale, purchase, exchange, investment in, transferring of, or similar type of disposition of the asset and/or asset tokens. In response to receiving the buy order 610, the backend servers 132 may generate and transmit a buy SC request 620 to the transaction ATS broker/dealer module 130 to request the creation of the SC 615 between the transaction ATS broker/dealer module 130 and the buyer 116. The transaction ATS broker/dealer module 130 may establish the SC 615 with the buyer 116 for the contemplated transaction involving the asset and/or asset tokens transferred to the platform digital wallet custody module 152.

The transaction ATS broker/dealer module 130 may perform on the SC 615 by transmitting message(s) instructing the digital wallet custody module 158 and the currency custody module 156 to release the buyer 116's funds and/or tokens to be exchanged for the seller 114's asset tokens while also transmitting message(s) instructing the platform digital wallet custody module 152 to release the seller 114's asset tokens to be exchanged for the buyer 116's funds and/or tokens (operation 625). Responsive to receiving the message from the transaction ATS broker/dealer module 130, the seller 114's platform digital wallet custody module 152 may transmit the asset token(s) to the buyer 116's platform digital wallet custody module 162 and/or currency custody module 156 may transmit trade proceeds 630 being exchanged for the asset token(s) to the seller 114's currency custody module 150 per the terms of the smart contract 615. The trade proceeds 630 may include cryptocurrency, cryptocurrency converted to fiat currency, and/or fiat currency. In certain aspects, the digital wallet custody module 158 may include or interface with a module configured to convert cryptocurrency (e.g., USDC) which may be held by the digital wallet custody module 158 into fiat currency acceptable by the seller 114's currency custody module 150. The digital wallet custody module 158 can, alternatively or additionally, transmit trade proceeds being exchanged for the asset token(s) that are held in crypto to the seller 114's digital wallet custody module 157. The secondary ledger 104 may create and store a blockchain entry corresponding to the transfer of the trade proceeds from the buyer 116's currency custody module 156 and/or digital wallet custody module 158 to the seller 114's currency custody module 150 and/or digital wallet custody module 157, respectively. In certain aspects, the seller 114 may also have, included within or coupled with the system 100, the digital wallet custody module 157 to receive and hold digital assets such as cryptocurrency in addition to or in place of fiat currency in exchange for asset tokens. In such aspects, the buyer 116's digital wallet custody module 158 may not convert cryptocurrency funds into fiat currency when transmitting the trade proceeds 630 to the seller 114's digital wallet custody module 157. In certain aspects, the seller 114's digital wallet custody module 157 can similarly include or interface with a module configured to convert cryptocurrency (e.g., USDC) which may be held by the digital wallet custody module 157 into fiat currency acceptable by the buyer 116's currency custody module 156. Responsive to receiving the message from the transaction ATS broker/dealer module 130, the seller 114's platform digital wallet custody module 152 may transmit the asset token(s) 635 to the buyer 116's platform digital wallet custody module 162 per the terms of the smart contract 615. The secondary ledger 104 may create and store a blockchain entry corresponding to the transfer of the asset token(s) 635.

The transaction ATS broker/dealer module 130 may record the smart contract and transaction (operation 640) and update and/or validate the capitalization (cap) table (operation 645) via the transfer agent 106, for example, based on the SC 615, the trade proceeds transferred to the seller 114's currency custody module 150 and/or digital wallet custody module (not shown), and/or the asset tokens 635 transferred to the buyer 116's platform digital wallet custody module 162 by the seller 114's platform digital wallet custody module 152. The transfer agent 106 may include and/or utilize user PII of the buyer 116, the seller 114, and/or the owner 112 in the update and/or validation of the cap table. The transfer agent 106 may maintain an up-to-date copy of the cap table and related user PII. The transfer agent 106 may update the cap table and/or related user PII based on input provided via the website 134 and routed to the transfer agent 106 via the backend servers 132 and/or transaction ATS broker/dealer module 130. The transfer agent 106 may also record entries pertaining to the contemplated and performed transactions involving the asset and/or asset tokens in the primary ledger 102 and/or secondary ledger 104.

Figure 7:
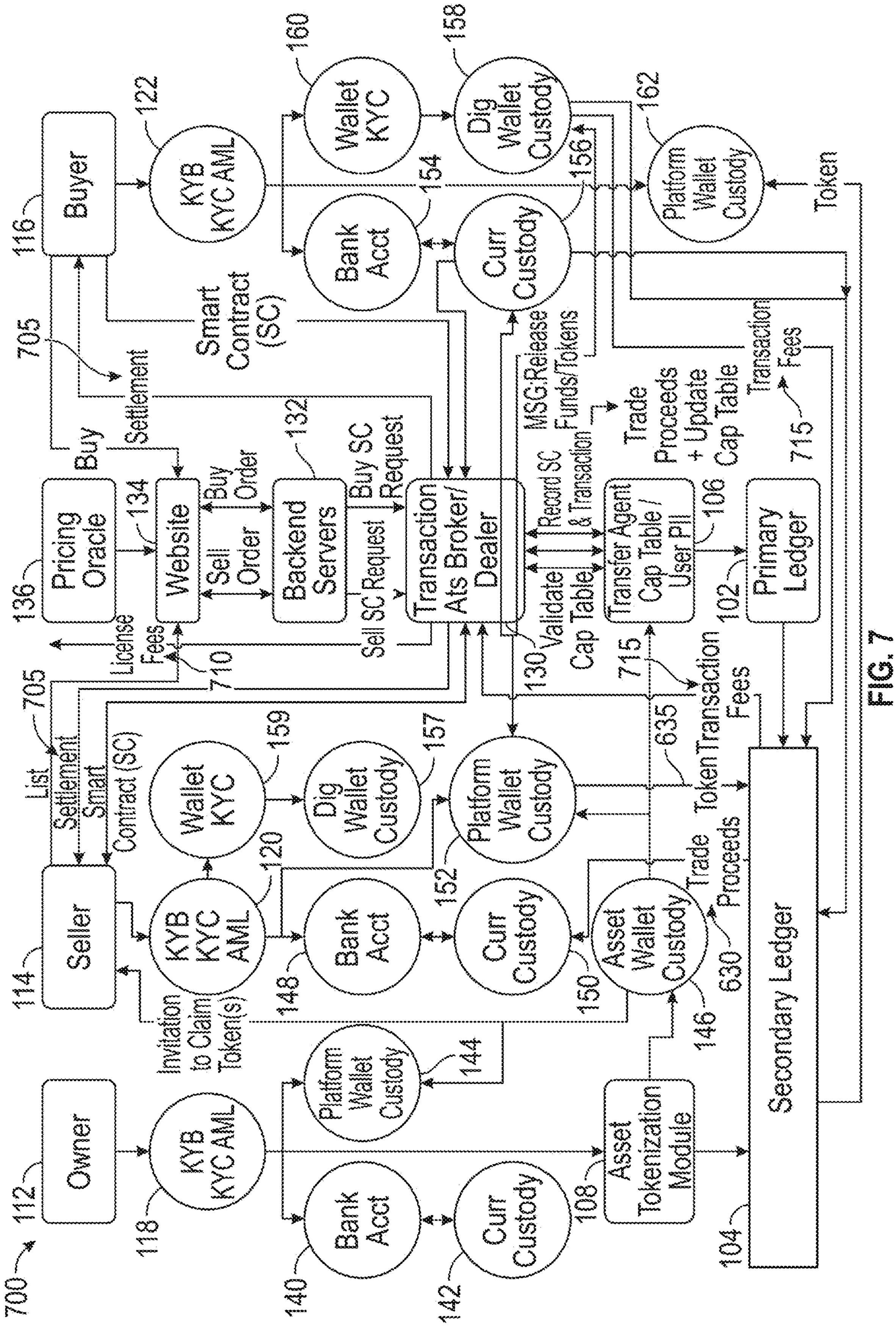
FIG. 7 illustrates an exemplary fee flow using the exemplary transaction platform of the system of FIG. 1.

FIG. 7 illustrates an exemplary fee flow 700 using the exemplary transaction platform of the system 100. As the trade proceeds are being transferred on the transaction platform of the system 100 as illustrated in FIGS. 5-6, the transaction ATS broker/dealer module 130 transmits requests to buyer 116's currency custody module 156 and/or digital wallet custody module 158 as well as to the seller 114's currency custody module 150 and/or digital wallet custody module 157 to collect the transaction fees 715 for distribution. The transactions fees 715 can include, but is not limited to, licensing fees 710 distributed to the transaction ATS broker/dealer module 130, partnership fees distributed to the transfer agent 106, and other appropriate fees. The transaction ATS broker/dealer module 130 may then receive the transaction fees 715 associated with the transaction completed on the transaction platform of the system 100 from the buyer 116's currency custody module 156 and/or digital wallet custody module 158 as well as to the seller 114's currency custody module 150 and/or digital wallet custody module 157. The transaction fees 715 may be payable and funded via fiat currency and/or cryptocurrency, for example, as described above. In some examples, the transaction fees 715 may be payable and funded by other digital assets, for example, NFTs. Moreover, transaction ATS broker/dealer module 130 transmits settlement statements 705 to the seller 114 and/or the buyer 116. The transfer of the transaction fees 715 may be recorded on both the primary ledger 102 and the secondary ledger 104. While the example illustrated in FIG. 7 shows that the transaction fees 715 are payable by and transferred to the transaction ATS broker/dealer 130, this is merely an example, and in other examples, the transaction fees 715 may be payable by and transferred to the transaction ATS broker/dealer module 130 by any combination of the owner 112, the seller 114, the buyer 116, and/or third parties outside the system 100, and/or their associated currency custody modules, digital custody modules, platform wallet custody modules, asset wallet custody modules, and/or the like.

The transaction ATS broker/dealer module 130 may distribute the license fees 710 associated with the transaction completed on the transaction platform of the system 100 to those owed the license fees 710, such as the transaction ATS broker/dealer module 130. Examples of license fees may include royalties, service fees, intellectual property license fees, and software license fees for software, systems, and methods used by the system 100 to complete the transactions. The license fees 710 may be funded from the transaction fees 715 received by the transaction ATS broker/dealer module 130.

The disclosed technologies provide numerous advantages over conventional systems. For example, the platform of the system 100 may provide owners and sellers with the ability to exit a commercial real estate investment (as an asset) much earlier than the typical hold period for such asset types. In most commercial real estate investments, investors may hold the asset for five to seven (5 to 7) years for various reasons associated with processes and procedures for transferring ownership of the asset as a whole. At the end of the hold period (which may be mandated by statute, regulation, or other law, for example, SEC Rule 144), the owner of an investment property (e.g., commercial real estate) may typically either transfer the property or refinance the property. Refinancing the property may provide a liquidity event to the investor. A technological system and method for fractionalizing and tokenizing such assets as described herein may provide owners of assets that would otherwise be subject to extended hold periods the ability to participate in liquidity opportunities and/or offer liquidity opportunities to their investors on a shorter timeline than with conventional legal processes, which may by and large be manually executed with extended delays. The technologies disclosed herein facilitate sellers in trading asset tokens and monetizing their investments in underlying assets, thereby unlocking an ability to re-invest capital and supporting the cycle of investment. For example, liquidity provided by the disclosed technology of the platform of the system 100, even after just one year, may help create at least five to seven (5-7) times the liquidity in the entire ecosphere compared to traditional approaches. As an example, compared to traditional approaches in which a share of a real estate investment property is held for five (5) years, the technology disclosed herein may facilitate the asset tokens being traded five (5), ten (10), one hundred (100), or more times, for example, within the same five years.

Figure 8:
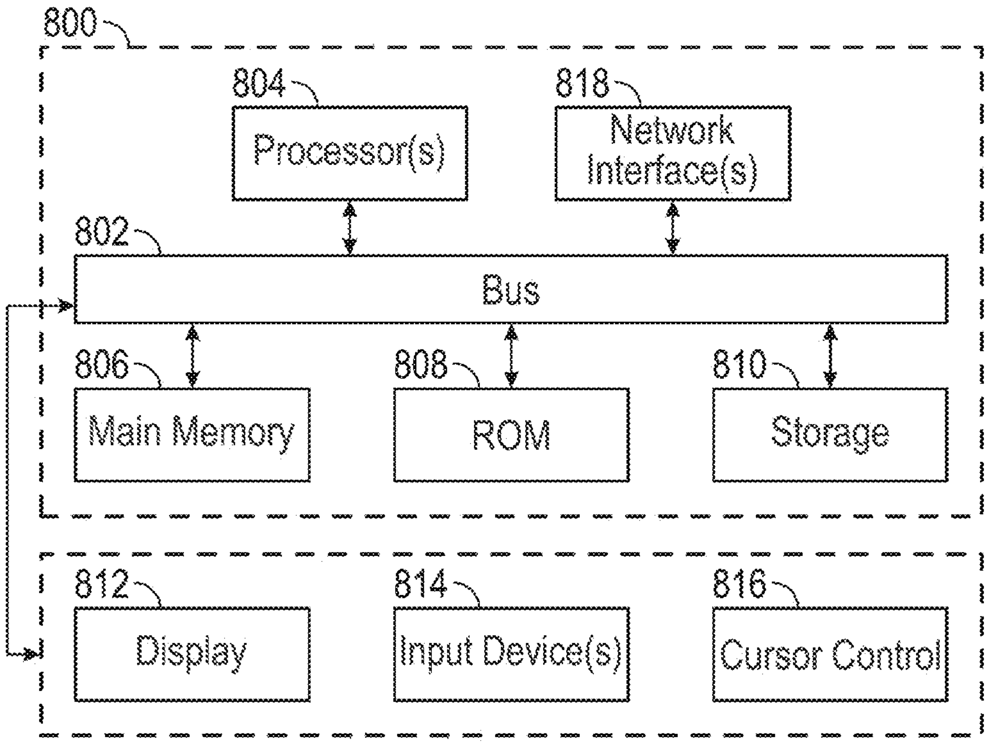
FIG. 8 depicts a block diagram of an example computer system in which embodiments described herein may be implemented.

FIG. 8 depicts a block diagram of an example computer system 800 in which embodiments described herein may be implemented. The computer system 800 may include a bus 802 or other electronic communication mechanism for communicating information, and one or more hardware processors 804 coupled with the bus 802 for processing information. The hardware processor(s) 804 may include, for example, one or more general purpose microprocessors and/or application specific integrated circuits (ASICs) configured to perform the processes and methods described herein and related processes and methods.

The computer system 800 also may include a main memory 806, for example, a random access memory (RAM), cache, and/or other dynamic storage devices, coupled to the bus 802 for storing information and instructions to be executed by the processor(s) 804. The main memory 806 also may be used for storing temporary variables or other intermediate information during execution of instructions to be executed by the processor(s) 804. Such instructions, when stored in storage media accessible to the processor(s) 804, may render computer system 800 into a special-purpose machine that is customized to perform the operations specified in the instructions.

The computer system 800 may further include a read only memory (ROM) 808 and/or other static storage device coupled to the bus 802 for storing static information and instructions for the processor(s) 804. A storage device 810, for example, a magnetic disk, optical disk, and/or USB thumb drive (Flash drive), etc., may be provided and coupled to the bus 802 for storing information and instructions.

The computer system 800 may be coupled via the bus 802 to a display 812, for example, a liquid crystal display (LCD), light emitting diode (LED) display, touch screen, and/or other electronic display for displaying information to a computer user. One or more input device(s) 814, including alphanumeric and/or other keys, may be coupled to the bus 802 for communicating information and command selections to the processor(s) 804. Another type of user input device may include cursor control 816, for example, a mouse, a trackball, a touchpad, and/or a set of cursor direction keys for communicating direction information and command selections to the processor(s) 804 and for controlling cursor movement on the display 812. In some examples, direction information and command selections as may be provided by cursor control may also or alternatively be implemented via receiving touches on a touch screen without the use of a separate cursor control device.

The computing system 800 may include a user interface module to implement a graphical user interface (GUI) that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the words “component,” “engine,” “system,” “database,” “data store,” and the like, as used herein, may refer to logic embodied in hardware or firmware, or to a collection of software instructions, possibly having entry and exit points, written in a programming language, such as, for example, Java, C, or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, and/or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 may cause the processor(s) 804 to perform the process steps and/or operations described herein. In alternative embodiments, hard-wired circuitry may be used in place of or in combination with software instructions.

The term "non-transitory media," and similar terms, as used herein refers to any non-transitory media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media may also take the form of acoustic or light waves, such as those generated during radio-wave and infra-red data communications.

The computer system 800 may also include one or more communication network interface(s) 818 coupled to the bus 802. The network interface(s) 818 may provide two-way data communication coupling to one or more network links that are connected to one or more local networks. For example, the network interface(s) 818 may include an integrated services digital network (ISDN) card, cable modem, satellite modem, or a modem to provide a data communication connection to a corresponding type of telephone line. As another example, the network interface(s) 818 may include a local area network (LAN) card to provide a data communication connection to a compatible LAN (and/or a wide area network (WAN) component to communicate with a WAN). Wireless links may also be implemented. In any such implementation, the network interface(s) 818 send and receive electrical, electromagnetic, and/or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP in turn may provide data communication services through the worldwide packet data communication network now commonly referred to as the "Internet." Local network and Internet both use electrical, electromagnetic, and/or optical signals that carry digital data streams. The signals through the various networks and the signals on network link and through network interface(s) 818, which may carry the digital data to and from the computer system 800, are example forms of transmission media.

The computer system 800 may send messages and receive data, including program code, through the network(s), network link and network interface(s) 818. In the Internet example, a server might transmit a requested code for an application program through the Internet, the ISP, the local network, and the network interface(s) 818.

The received code may be executed by the processor(s) 804 as it is received, and/or stored in the storage 810, or other non-volatile storage for later execution.

Introduction to Regenerative Model—Continuous Evolution System ("RM-CES")

In certain aspects the RM-CES is a series of artificial intelligence and machine learning algorithms that help to continually evolve and improve a given Model (the "Model") that is running in a technological system (e.g., ecosystem). The RM-CES is designed to receive data inputs from the steps taken specifically by reviewers-legal, non-legal, to self-improve itself to ideally capture what those reviewers are looking for. In a system where there is consistency (but not an exact copy of the data being uploaded), the RM-CES reduces the amount of time it takes to train new models to meet all the cases that are needed. A system with Regenerative training allows deployment of a technological system that the actual hands on team (non-engineering, non-technical) can start creating and deploying models in production that can significantly boost productivity instead of relying on data scientists to fine tune for specific tasks.

Overall, the RM-CES is run via a user interface. A human (typically an Analyst working with the technology system that uses the Models via a computing device) will interact with the RM-CES such that the RM-CES receives data sets that are used to improve the given Models. The Analyst will evaluate the results from each RM-CES "session" with the Model. Through repeated cycles of examples and corrections, RM-CES effects measurable improvements in the given Model across a range of metrics. Once performance levels meet a certain standard (set by the technology system and its business leaders) the Model is published into production.

RM-CES will work with Models that answer a given "question" or provide insights on a given "topic." The RM-CES also allows for a given Model to continue to improve and adapt to changes in the "marketplace."

For example, some Models might use Artificial Intelligence and Machine Learning to extract legal requirements from government regulations. The RM-CES would help keep the Model relevant in this example. Initially, for example, a government regulation might have two clauses (which appear in legal contracts in an industry that are related to that regulation). However, starting in a new year, the regulation might have a new, third clause that must be included in legal contracts. RM-CES manages the Model that is responsible for extracting these requirements "learn" about the third clause, begin to search for that third clause, and begin to require the inclusion of that third clause during document review (e.g. ensuring that documentation is up-to-date).

Initial Use Case: Exchange

An exemplary initial use case for the RM-CES 950 is within an Exchange ("Exchange" includes, but is not limited to, a traditional Financial Exchange, a Secondary Market Exchange, an Alternative Trading System or ATS, and/or other any other systems where securities, commodities, derivatives, and/or any other financial or real asset instruments are transacted) of any of the systems in FIGS. 1 and 5-7. The RM-CES 950 interacts with multiple Models that are running in the background of the Exchange, and helps to continuously train and improve them.

Figure 9:
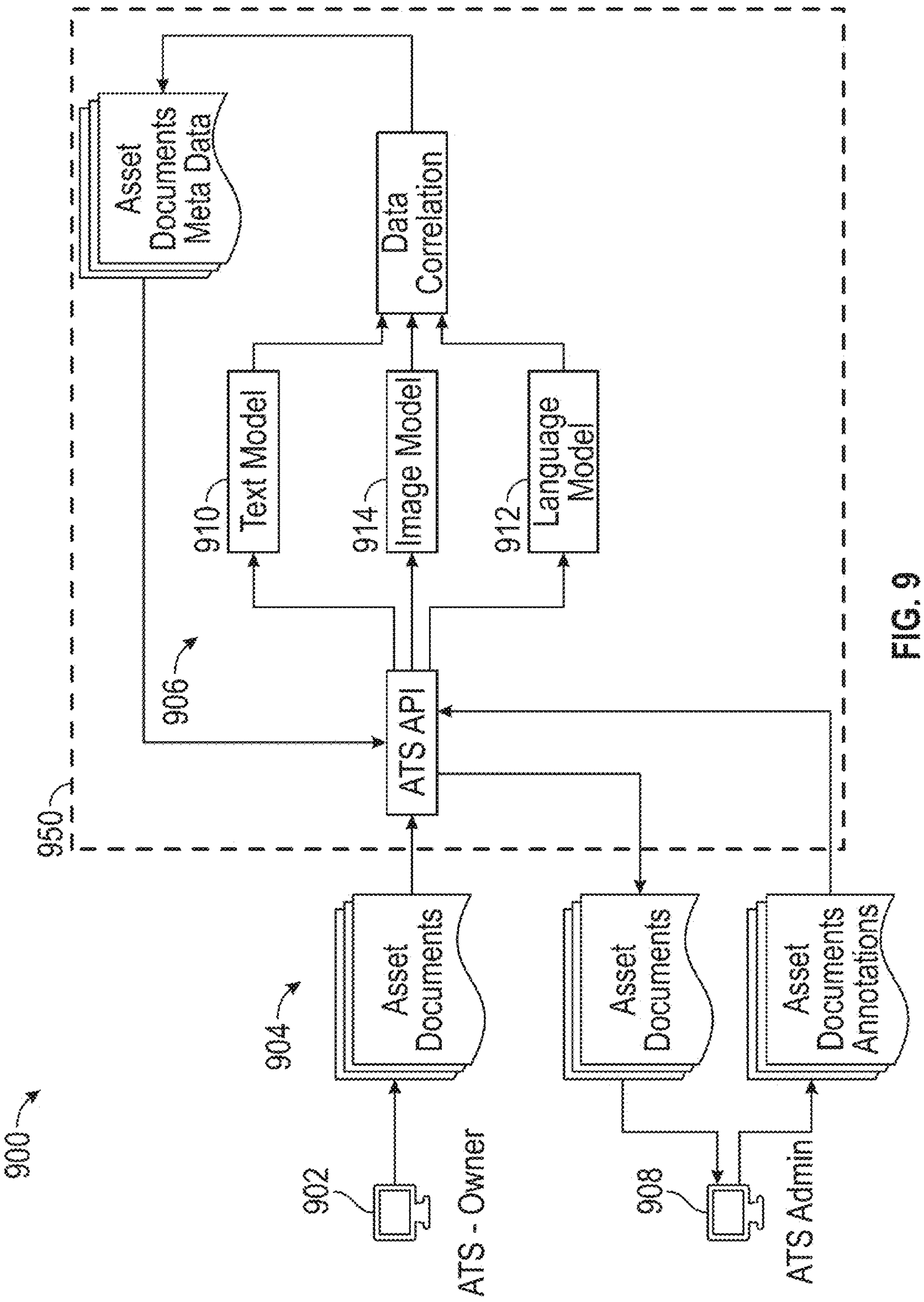
FIG. 9 is an example flow chart depicting a system flow, according to certain aspects of the present disclosure.

For example, multiple important Artificial Intelligence and/or Machine Learning Models 906 could be used in the "asset onboarding" process 904 on an Exchange. In certain aspects, the AI/ML models 906 include, but not limited to, a text model 910, an image model 914, and a language model 912. With reference to FIG. 9 illustrating a flow chart 900 using any of the systems in FIGS. 1 and 5-7, if an asset owner ("Owner") 902, such as the owner 112, decides they would like to list their asset on an Exchange and permit the secondary trading of shares (digital shares, tokens, and/or other mediums to reflect a portion of legal ownership) of their asset, the Owner must undertake the asset onboarding process 904.

This is a multi-step process that involves the submission of documents (financial, legal, marketing, other appropriate documents) by the Owner. the documents could include, but are not limited to: legal documents that prove the Owner has the right to list the asset on an Exchange, legal documents reflecting the current investors in the asset, marketing materials that explain what the asset is [e.g. a Multi-Family Apartment building) and financial documents pertaining to the financial health and past performance of the asset. For example, uploaded documents can be either structured or unstructured data. The AI/ML Models 906 are configured to perform the same review process on multiple types of documents. Certain administrators ("Admins") 908 of the Exchange must review the documents that are onboarded (using a combination of technology models (as previously discussed in this application), and also manual review), and ultimately approve these documents and the overall asset for listing on the Exchange.

The Admins 908 are relying on a series of Artificial Intelligence and/or Machine Learning Models 906 within the Exchange—that "live" or reside within the Asset Onboarding System—to perform the bulk of this due diligence. Using a series of sophisticated machine learning and artificial intelligence algorithms, these Models are configured to perform a multitude of tasks, as described below.

The AI/ML models 906 evaluate the documents that are submitted/received to ensure that all of the required data has been provided. For example, if 17 documents are required to properly document the asset, the AI/ML models 906 ensure that all 17 documents are uploaded and correct (e.g. that the Profit and Loss Statement ("P&L") is actually a P&L, and the "Regulation D Filing" is actually a Regulation D filing, and pertains to the specific asset in question, and that the entity, such as an LLC, is in good standing). The AI/ML models 906 are configure to confirm that the required legal documentation for the asset exists and is in good standing. For example, confirming Secretary of State filings have been provided and the date indicates good standing. The AI/NIL models 906 are configured to extract information from the documents to populate the required fields and ultimately the individual landing page for the asset in the Exchange website, mobile app, etc. (so that the asset can be clearly and accurately displayed to any Users of the Exchange). For example, extracting information from marketing materials to describe the asset. For example, the AI/ML models 906 are configured to select the most appropriate photos of the asset from what has been provided (don't duplicate two photos of the kitchen). For example, the AI/ML models 906 are configured to display recent financial performance of the asset.

After the AI/NL models 906 perform their processes on the uploaded documents and data, the result/output is a clear, easy-to-approve "checklist" that clearly reflects the summary data needed to list the asset. The Admin 908 reviews this output, confirms it is in-line with what is needed, and ultimately gives, via a computing device, the final approval to list the asset on the Exchange. The RM-CES 950 is used to improve each of the AI/ML models 906 that are running such an onboarding process.

In the initial example of the Exchange, the RM-CES 950 is configured to evolve and improve the AI/ML models 906, but are not limited to such models.

Text Inference Model 910

The Text Model 910 is configured to look for specific patterns of language within financial and/or legal documents, and is able to detect specific portions of text related to the asset. For example, the Text Model 910 is configured to scan documents and return values to "fill in the blanks" in an asset summary sheet (e.g., Number of apartments in the apartment complex=125). Another example might be looking for and finding contractual terms such as the "maximum percentage of ownership by a single entity" that is allowed for a given asset (and returning a value, e.g., 20%)

Large Language Model (LLM) 912

The Large Language Model 912 is configured to extract the context of the text it has been given (e.g., received). The Large Language Model 912 is configured to "read" the document and then answer questions such as "what is the maximum share ownership a single investor can have?" The Large Language Model 912 is configured to create content (written language content) for the Exchange based on non-standardized inputs. Content could be a description of a multi-family apartment building that is listed on the Exchange (based on a series of marketing materials uploaded by the Owner).

Image Descriptor Model 914

The Image Descriptor Model 914 is configured to create labels and descriptions for photos of an asset that are uploaded by the Owner. An example might be labeling a photo of a pool as "Pool" and a kitchen as "Kitchen." The Image Descriptor Model 914 is configured to compare the images provided versus the asset details to ensure that the images provided are the actual images of the property. For example, if the Owner uploads photos of a gym or pool—but the property details (from web sources) don't have those amenities—then the Image Descriptor Model 914 would flag the uploaded photos as potential mistake images. In certain aspects, the Image Descriptor Model 914 is configured to intercept property names on logos within the images that are provided, and compare those images to the asset name.

Market Monitoring Model

In certain aspects, the AI/ML models 906 include a Market Monitoring Model that is configure to monitor market dynamics (e.g. average number of trades per second/minute/hour), average dollar value of trades per second/minute/hour) and create error flags that interact with other systems running in the Exchange, such as a Throttle & Kill Switch ("TKS") system.

In certain aspects, the AI/ML models 906 include a Fraud/Bad Actor Model configured to monitor computing devices of Users who are live on the Exchange, with the goal of identifying bad actors. The Fraud/Bad Actor Model is configured to monitor for irregular patterns of action, and watch for behavior patterns that have been previously identified as fraudulent. Bad actors would be defined as individuals who are placing trades (or taking other actions within the Exchange) that have nefarious goals (e.g., goals other than placing a good faith transaction).

In certain aspects, the AI/ML models 906 include a Data Validation and Assessment Valuation Model that is configured to gather inputs from the documents that an Owner provides to generate a proposed value of the asset.

With reference to a training flow chart 1000 in FIG. 10, the AI/ML models 906 used in the system are trained and improved in several ways including, but not limited to, improvements categories discussed below.

Supervised

Humans label/classify data points that are then used to train the AI/ML models 906 in identifying specific categories (e.g., Image Descriptor Model). In certain aspects, the AI/ML models 906 are trained to identify different categories in a photo via human input such as labeling multiple photos of a pool, a kitchen, a gym, and other appropriate categories.

Unsupervised

In certain aspects, the AI/ML models 906 receives data input and there is no manual input or work done to that data to train the AI/ML models 906. Here, the algorithm of the AI/ML models 906 finds the unique patterns in the data (but without getting a label or classification from the AI/ML models 906). Here, the AI/ML models 906 are providing (as output) a grouping of similarities. For example, with the Fraud detection algorithm discussed above, the AI/ML models 906 are identifying something that is "different" from the rest (anomalous trading patterns). The models of the AI/ML models 906 can help humans to segment data into groupings, and these data groupings can then be used as part of a Supervised Model as discussed above.

Semi-Supervised

In certain aspects, the AI/ML models 906 combine the two styles/categories of supervised and unsupervised together. The AI/ML models 906 are relevant with large data sets that are impossible for a human to entirely label/classify alone. For example, an Analyst might take a supervised approach and label 2,000 of 2,000,000 images. The Analyst would then input the labeled and the remainder of the unlabeled data into the AI/ML models 906. The AI/ML models 906 are trained to find the patterns between the labeled and the unlabeled images, and then label the unlabeled images based on learning from the labeled ones. This type of Model is relevant with the Text Inference Model (as one example) in instances where the review of legal documents over thousands of pages is undertaken by the Model.

Regulation is one reason the AI/ML models 906 of the RM-CES 950 improves systems. In the instance of the asset onboarding process 904: over time, laws and regulations around assets will change, and these changes might affect the language used in the underlying documents that are uploaded as part of that process. Potentially standard language in Regulation D filings will change, and the AI/ML models 906 will need to be updated to recognize this new language and these new parameters. This would result in changes to the "legal checklist" that the AI/ML models 906 must confirm for a given asset before it can be listed. Potentially the industry standard will change in the Lending community, and covenants around maximum percent of concentrated ownership will change from 20% to 30% (and/or additional covenants will also apply). This would result in new language patterns and new numerical values suddenly becoming relevant to the Model Another reason why the AI/ML models 906 within an Exchange must continually improve is related to anti-Fraud security measures and the threat of Bad Actors. Hackers and other Bad Actors are using more and more advanced computing systems to try and hack into, disrupt, and ultimately steal funds from financial ecosystems. Attacks will often come in waves (with each attack progressing based on discovered weaknesses in the financial ecosystem). Detection and defensive Models must be continuously evolving to detect—and respond to—threats that are dynamic in nature.

Figure 10:
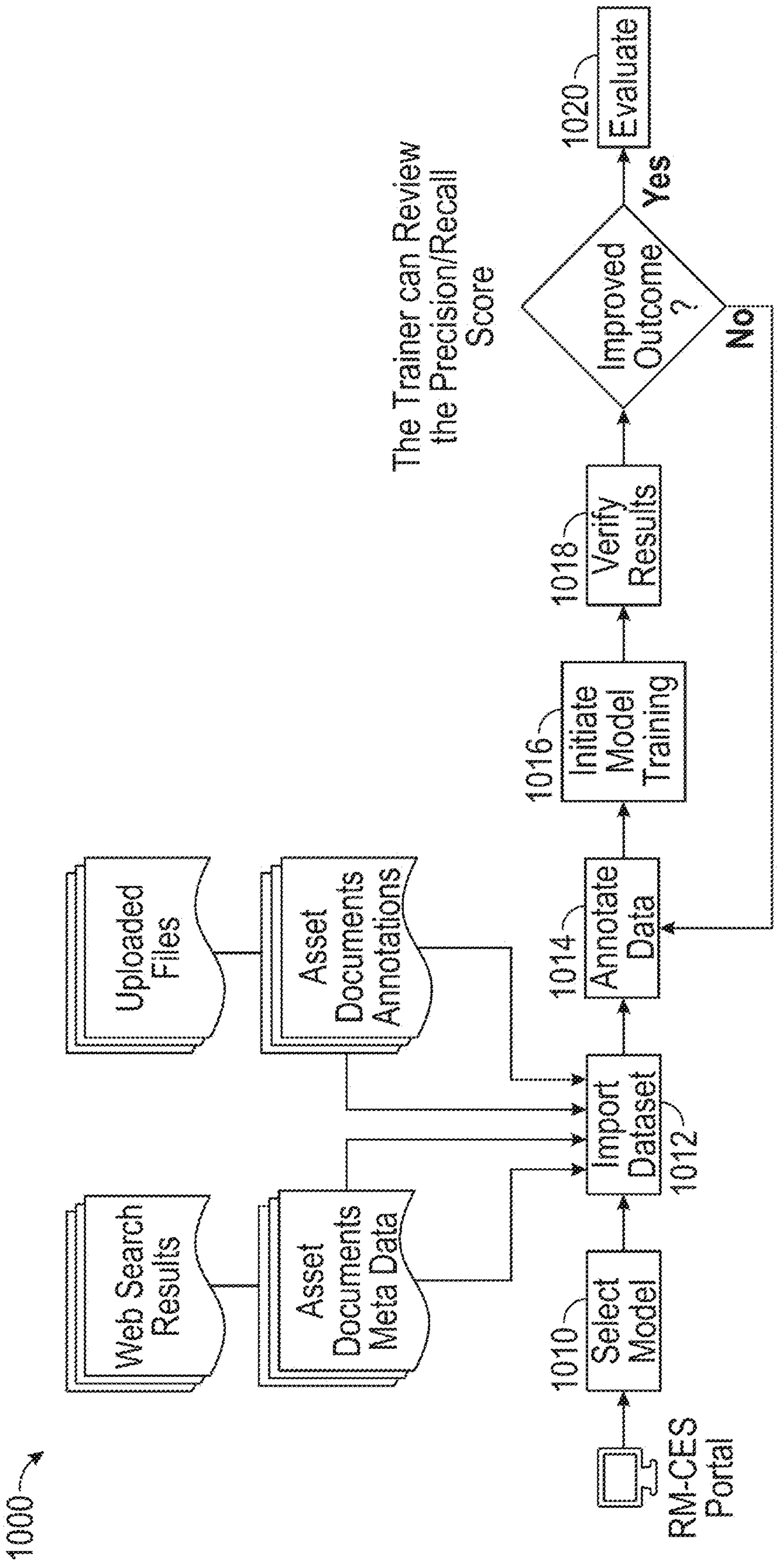
FIG. 10 illustrates an exemplary flow chart for training a model of a plurality of models running on an ecosystem, according to certain aspects of the present disclosure.

With further reference to FIG. 10, as depicted at block 1010, the RM-CES 950 is configured to selectively apply the appropriate model of the AI/ML models 906 to be performed on an import dataset 1012, which can be aggregated from, but not limited to, web search results, uploaded files, extracted asset documents meta data, asset documents annotations, and other appropriate sources. As depicted at block 1014, the selected model(s) of the AI/ML models 906 is configured to annotate the dataset 1012. In certain aspects, such as in the supervised learning, the RM-CES 950 can receive annotations to the dataset 1012 via input from a computing device of an analyst. The selected model(s) of the AI/ML models 906 is configured to train based on the annotations to the dataset 102, as depicted at 1016. The selected model(s) of the AI/ML models 906 outputs results, which are verified, as depicted at block 1018. If the output results are determined to not improve the outcome, then the process repeats back to block 1014. On the other hand, if the output results are determined to improve the outcome, then the process continues to an evaluation process, as depicted at block 1020.

Figure 11:
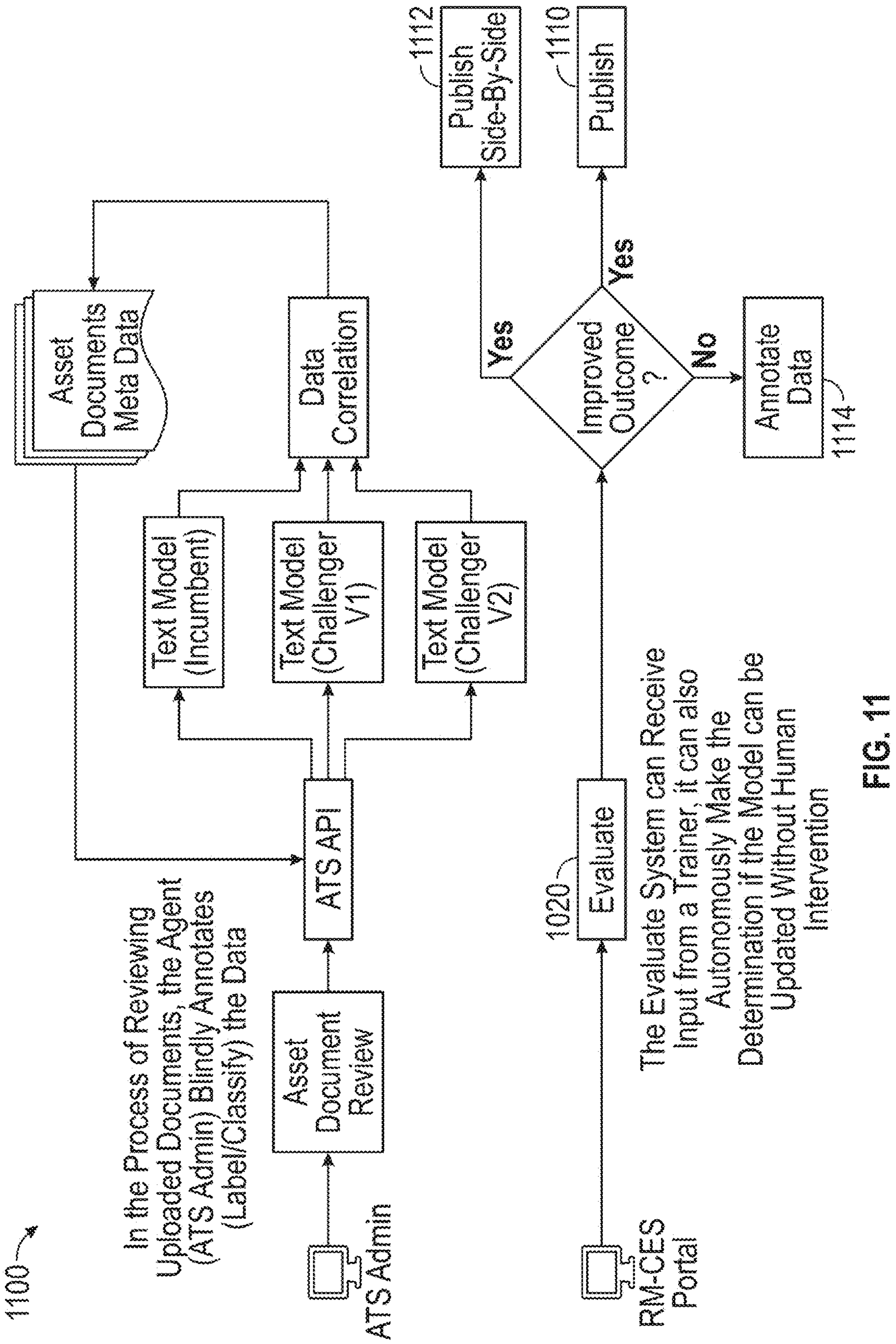
FIG. 11 illustrates an exemplary flow chart for evaluating a model of a plurality of models running on an ecosystem, according to certain aspects of the present disclosure.

With reference to an evaluation flow chart 1100 for evaluation in FIG. 11, the RM-CES 950 is able to run multiple versions of the model in parallel where data (documents uploaded by asset owner/automated systems) is evaluated and classified.

Measuring RM-CES Impact on Model Success: Recall and Precision

The RM-CES 950 can improve a given Model of the AI/ML models 906 (and this improvement can be quantified and measured) in two primary areas: Recall and Precision. Depending on the nature of the Model of the AI/ML models 906 in question, one or both may be relevant.

The RM-CES 950 is configured to measure the continuous improvement of a Model of the AI/ML models 906 (in both Recall and Precision) based on the Model's performance with various data sets, as depicted at block 1020. Data sets typically consist of both "correct" data elements and "incorrect" data elements for the given question/topic that is relevant for the Model. This allows for the Model to be scored across four "quadrants":

| The model says the data element is "correct": | The model says the data element is "incorrect": |
|---|---|
| True positive<br>The data element is "correct" and is identified by the model as correct | True negative<br>The data element is "incorrect" and is identified by the model as incorrect |
| False positive<br>The data element is "incorrect" but is identified by the model as correct | False negative<br>The data element is "correct" but is identified by the model as incorrect |

Recall:

A ratio or fraction that reflects the number of correctly identified (or "recalled") data elements—and compares that number to the universe of relevant options that exist within the data set (the total number of correct choices the Model could have recalled). Said another way, Recall evaluates the Model's performance across True positives only. For example, a data set might have 25 different instances of legal phrasing that all ultimately reflect the answer to the "maximum percentage of ownership allowed by a single entity" for the given asset. If the Model identifies 20 of those instances as being relevant to the question of what is the "maximum percentage of ownership by a single entity", but misses that 5 other data elements correctly answer the question as well, it would have a Recall of 0.8.

Precision

A percentage that explains the number of correctly identified data elements out of the entire data set universe (which incorporates not only "correct" data elements identified as "correct," but also "incorrect" data elements identified as "incorrect"). Said another way, precision evaluates the Model's performance across all four quadrants (True positive, false positive, true negative, false negative). For example, a data set might have 25 different instances of legal phrasing that all ultimately reflect the answer to the "maximum percentage of ownership allowed by a single entity?" for the given asset, and also have 25 different instances of legal phrasing that are not correct in answering the question. If the Model identifies 20 of the correct instances as being relevant to the question of what is the "maximum percentage of ownership by a single entity?", but also says that 5 of the incorrect data elements should correctly answer the question as well, it would have a net Precision of [25-5 for "correct" ]+[25-5 for "incorrect]/50=40/50=80% Precision.

When it is determined that the outcome has improved, the given Model of the AI/ML models 906 is either published alone, as depicted at block 1110, or published side-by-side of an incumbent model, as depicted at block 1112. When it is determined that the outcome has not improved, further annotation is performed, as depicted at block 1114.

General Use Process:

The RM-CES 950 works in tandem with input and guidance based on input from a person (the "Analyst") who is familiar with the overall technology system using the RM-CES 950. In the initial use case of an Exchange, the Analyst might be someone on the Asset Onboarding team who is responsible for reviewing and approving various documents (and extracted data from those documents) that have been uploaded by the Owner. The Analyst will log in to the RM-CES 950 system (for example, via a webpage). The Analyst selects what Model of the AI/ML models 906 (within the technology system) they wish to evolve using the RM-CES 950. For example, the Analyst chooses to improve a Large Language Model that currently classifies given multi-family apartment buildings as either "Luxury" or "Economy."

Next, the Analyst will start uploading "evidence" into the RM-CES 950 that will be used to evolve the Model of the AI/ML models 906. This evidence would be different data sets, as discussed above. The data sets will have a combination of "correct" and "incorrect" data relevant to the question/topic of the Model of the AI/ML models 906. In this example, there might be various paragraphs that describe properties with different keywords nestled in the paragraphs that code to either "Luxury" or "Economy." Luxury can include, but is not limited to, marble countertops, rooftop pool, concierge service. Luxury "distractors" to try and elicit a false positive might be: mink coat, celebrity, millionaire, affluent. Economy can be, but is not limited to, value, understated, clean, well-maintained. Economy "distractors" can be, but not limited to, Gross domestic product, finances, budget.

The RM-CES 950 will run the Model of the AI/ML models 906 through the dataset, and the Analyst will review the results that are returned. The Analyst will confirm the results across all four quadrants (true positive, false positive, true negative, false negative). The RM-CES 950 will return a Recall and Precision score. The RM-CES 950 will then run the Model of the AI/ML models 906 through the data set again to evolve the Model of the AI/ML models 906 on the incorrect answers.

The Analyst can provide multiple data sets to the RM-CES and the Model of the AI/ML models 906 will continue to evolve based on this cycle of: (1) Model of the AI/ML models 906 reviews data set, (2) Model of the AI/ML models 906 produces responses, (3) Grading of responses by Analyst, (4) Reviewing of Model's correct and incorrect responses with the RM-CES 950, (5) Rerunning of the Model of the AI/ML models 906 to learn the true positives, false positive, true negatives, and false negatives with the RM-CES 950, (6) Introduction of a clean data set for the Model of the AI/ML models 906 to run through again.

The RM-CES 950 will continue running through these evolution cycles until the Recall and Precision (on a clean data set) are above the required thresholds for the given technology system. In the example of the Exchange, hypothetically the Model of the AI/ML models 906 in the example above needs to be above 0.85 Recall and 75% Precision before it can be published into Production.

"Incumbent" Versus "New" Models Improved by RM-CES—Considerations:

As discussed above, sometimes Models of the AI/ML models 906 that are evolved by the RM-CES 950 are deployed into Production simply based on their scores reaching the required threshold of success (in the example of the Exchange, the Model of the AI/ML models 906 for asset onboarding needs to be above 0.85 Recall and 75% Precision before it can be published into Production).

However, in more advanced systems (where multiple Models might be running simultaneously to answer related questions/topics), it can be complicated to remove an incumbent Model and simply replace it with a new and improved Model. In some instances, the technology system (here, an Exchange) might have an automated way to switch between a given number of Models of the AI/ML models 906 for a certain question/topic (based on their performance with RM-CES at various testing intervals). In this type of setup, both Models might start running simultaneously in Production. The RM-CES 950 would have several predetermine set intervals designed to test each model side-by-side (in real-time, live conditions).

An example where running Models of the AI/ML models 906 in parallel would be with fraud detection. Each model would be monitoring User activity for a given period (minutes, days, weeks) and each would be asked to identify Bad Actors and suspicious trading activity.

Each Model would be scored on Precision and Recall at the end of the period. The Analyst would evaluate which scores matter most from a Business point of view, and either: (1) Choose Model 1 (better Recall), (2) Choose Model 2 (better Precision), or (3) Continue to run both in parallel (Recall and Precision are equally-weighted in the Business and the cost to run both Models is justified by the importance of both metrics).

| FRAUD MODEL | Model 1 | Model 2 |
|---|---|---|
| User 123 is fraudulent | Fraud-true positive | Fraud-true positive |
| User 784 is fraudulent | Fraud-true positive | Not fraud-false negative |
| User 901 is NOT fraudulent | Fraud-false positive | Not fraud-true negative |
| User 823 is NOT fraudulent | Fraud-false positive | Not fraud-true negative |
| User 756 is NOT fraudulent | Not fraud-true negative | Not fraud-true negative |
| Recall: | 2/2 = 1.0 | 1/2 = 0.5 |
| Precision: | 3/5 = 60% | 4/5 = 80% |

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

In one aspect, a method may include an operation, an instruction, and/or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

The functions, acts or tasks illustrated in the Figures or described may be executed in a digital and/or analog domain and in response to one or more sets of logic or instructions stored in or on non-transitory computer readable medium or media or memory. The functions, acts or tasks are independent of the particular type of instructions set, storage media, processor or processing strategy and may be performed by software, hardware, integrated circuits, firmware, microcode and the like, operating alone or in combination. The memory may comprise a single device or multiple devices that may be disposed on one or more dedicated memory devices or disposed on a processor or other similar device. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely (anywhere a range within or a discrete number within a range of ninety-five percent and one-hundred and five percent), but not necessarily wholly, that which is specified. It encompasses all but an insignificant amount.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112(f) unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:

onboarding asset data defining an asset selected from among: a private credit asset or a private debt asset, comprising:

utilizing appropriate models, from among a plurality of different models, based on document type to extract a portion of the asset data from each document in a plurality of documents; and formulating a checklist reflecting a summary of the asset data collectively including data for listing the asset for trading;

utilizing a further model annotating the plurality of documents forming a plurality of annotated documents indicating correct examples and incorrect examples; and automatically, as part of a continuous training cycle, and concurrently with onboarding the asset data, training the plurality of different models based on the plurality of annotated documents, wherein the plurality of different models includes at least (1) a regulatory model that identifies, in real-time during the onboarding process, modifications to the formulated checklist and asset data locations within the plurality of submitted documents based on changing laws and regulations associated with the asset and (2) an anti-fraud security measure model that identifies manipulative actions or irregularities within the plurality of submitted documents, the training evolving and improving performance of the plurality of different models, wherein the training of both the regulatory model and the anti-fraud security measure model occurs simultaneously and in coordination with extracting the asset data from the plurality of documents, including:

receiving a selection of a first model from among the plurality of different models;

iteratively training the first model utilizing at least a subset of the plurality of annotated documents and at least one previously annotated document until a first user feedback score is above a first predetermined threshold indicative of model improvement for at least one of: recall or precision, including:

running the first model producing first responses;

receiving the first user feedback score indicating correctness of the produced first responses; and checking the first feedback score relative to the first predetermined threshold; and publishing the first model responsive to the user feedback score being above the first predetermined threshold;

receiving a selection of a second model from among the plurality of different models;

iteratively training the second model in parallel with the first model utilizing at least another subset of the plurality of annotated documents and at least one other previously annotated document until a second user feedback score is above a second predetermined threshold indicative of model improvement for at least one of: recall or precision, including:

running the second model producing second responses;

receiving the second user feedback score indicating correctness of the second produced responses; and checking the second user feedback score relative to the second predetermined threshold; and publishing the second model side by side with the first model responsive to the user feedback score being above the second predetermined threshold.

2. The method of claim 1, wherein iteratively training the first model comprises iteratively training the anti-fraud security measure model to learn true positives, false positives, true negatives, and false negatives.

3. The method of claim 1, wherein iteratively training the first model comprises iteratively training the regulatory model to learn true positives, false positives, true negatives, and false negatives.

4. The method of claim 1, wherein publishing the first model comprises replacing an incumbent anti-fraud security measure model with another anti-fraud security measure model.

5. The method of claim 1, wherein publishing the first model comprises running a first anti-fraud security measure model in parallel with an incumbent anti-fraud security measure model.

6. The method of claim 1, wherein the plurality of different models includes at least one of: a text model, an image model, and a language model.

7. The method of claim 1, wherein onboarding asset data defining an asset selected from among: a private credit asset or a private debt asset comprises onboarding a private credit asset.

8. A system comprising:

a processor;

system memory coupled to the processor and storing instructions, which, when executed, cause the processor to:

onboard asset data defining an asset selected from among: a private credit asset or a private debt asset, comprising:

utilize appropriate models, from among a plurality of different models, based on document type to extract a portion of the asset data from each document in a plurality of documents; and formulate a checklist reflecting a summary of the asset data collectively including data for listing the asset for trading;

utilize a further model annotating the plurality of documents forming a plurality of annotated documents indicating correct examples and incorrect examples; and automatically, as part of a continuous training cycle, and concurrently with onboarding the asset data, train the plurality of different models based on the plurality of annotated documents, wherein the plurality of different models includes at least (1) a regulatory model that identifies, in real-time during the onboarding process, modifications to the formulated checklist and asset data locations within the plurality of submitted documents based on changing laws and regulations associated with the asset and (2) an anti-fraud security measure model that identifies manipulative actions or irregularities within the plurality of submitted documents, the training evolving and improving performance of the plurality of different models, wherein the training of both the regulatory model and the anti-fraud security measure model occurs simultaneously and in coordination with extracting the asset data from the plurality of documents, including:

receive a selection of a first model from among the plurality of different models;

iteratively train the first model utilizing at least a subset of the plurality of annotated documents and at least one previously annotated document until a first user feedback score is above a first predetermined threshold indicative of model improvement for at least one of: recall or precision, including:
run the first model producing first responses;
receive the first user feedback score indicating correctness of the produced first responses; and
check the first feedback score relative to the first predetermined threshold; and
publish the first model responsive to the user feedback score being above the first predetermined threshold;
receive a selection of a second model from among the plurality of different models;
iteratively train the second model in parallel with the first model utilizing at least another subset of the plurality of annotated documents and at least one other previously annotated document until a second user feedback score is above a second predetermined threshold indicative of model improvement for at least one of: recall or precision, including:
running the second model producing second responses;
receive the second user feedback score indicating correctness of the second produced responses; and
check the second user feedback score relative to the second predetermined threshold; and
publish the second model side by side with the first model responsive to the user feedback score being above the second predetermined threshold.

9. The system of claim 8, wherein instructions, which, when executed, cause the processor to iteratively train the first model comprise instructions, which, when executed, cause the processor to iteratively train the anti-fraud security measure model to learn true positives, false positives, true negatives, and false negatives.

10. The system of claim 8, wherein instructions, which, when executed, cause the processor to iteratively train the first model comprise instructions, which, when executed, cause the processor to iteratively train the regulatory model to learn true positives, false positives, true negatives, and false negatives.

11. The system of claim 8, wherein instructions, which, when executed, cause the processor to publish the first anti-fraud security measure model comprise instructions, which, when executed, cause the processor to replace an incumbent anti-fraud security measure model with the first anti-fraud security measure model.

12. The system of claim 8, wherein instructions, which, when executed, cause the processor to publish the first anti-fraud security measure model comprise instructions, which, when executed, cause the processor to run the first anti-fraud security measure model in parallel with an incumbent model.

13. The system of claim 8, wherein the plurality of models includes at least one of: a text model, an image model, and a language model.

14. The system of claim 8, wherein instructions, which, when executed, cause the processor to onboard asset data defining an asset selected from among: a private credit asset or a private debt asset comprise instructions, which, when executed, cause the processor to onboard a private credit asset.

* * * * *